US 6,535,298 B2

(12) United States Patent
Winter et al.

(10) Patent No.: US 6,535,298 B2
(45) Date of Patent: Mar. 18, 2003

(54) STORING AND RETRIEVING DIGITAL CAMERA IMAGES VIA A USER-COMPLETED PROOF SHEET

(75) Inventors: Kirt A Winter, San Diego, CA (US); John Mark Hatcher, Escondido, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/735,090

(22) Filed: Dec. 12, 2000

(65) Prior Publication Data

US 2002/0051201 A1 May 2, 2002

Related U.S. Application Data

(63) Continuation-in-part of application No. 09/173,050, filed on Oct. 15, 1998.

(51) Int. Cl.[7] .............................................. G06F 13/00
(52) U.S. Cl. ..................... 358/1.16; 358/1.15; 358/487; 355/40
(58) Field of Search ............................... 358/1.12, 1.13, 358/1.14, 1.15, 296, 402, 403, 407, 468, 479, 487; 399/84; 355/40, 41

(56) References Cited

U.S. PATENT DOCUMENTS 6,141,111 A * 10/2000 Kato .......................... 358/1.15

OTHER PUBLICATIONS

Press Release, Mar. 22, 1999 "Compaq Goes All–In–One With New A900 For Printing, Faxing, Color Copying and Scanning".
Compaq A1000 All–In–One User Guide, 1999.
Compaq A900 All–In–One User Guide, 1998.

* cited by examiner

Primary Examiner—Mark Wallerson

(57) ABSTRACT

Methods for storing and retrieving digital image files, such as photographs taken by a digital camera, to and from an archival image storage system such as a file server or a mass storage medium. A combination proof sheet and order form is printed containing an array of thumbnail images, corresponding image selection user designation areas, and a storage selection user designation area markable by the user to specify selected images to be stored on or retrieved from the image storage system. The form is scanned to detect the user designation areas completed by the user, and then perform the indicated operation. A printing system includes programming for generating, scanning, and processing the form, and for storing and retrieving the selected images.

28 Claims, 22 Drawing Sheets

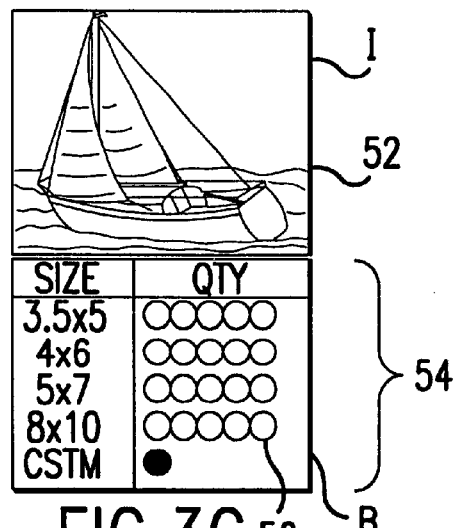
FIG. 3B
FIG. 3C
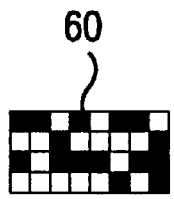
FIG. 3D
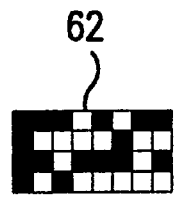
FIG. 3F n-BIT DATA KEY

STORING AND RETRIEVING DIGITAL CAMERA IMAGES VIA A USER-COMPLETED PROOF SHEET

CROSS-REFERENCE TO RELATED APPLICATIONS

This application is a continuation-in-part of the co-pending U.S. application Ser. No. 09/173,050, by Winter et al., filed Oct. 15, 1998, titled "System and Method For Printing and Scanning a User-Completed Digital Still Camera Image Proof Sheet and Order Form". This application is assigned to the assignee of the present invention and is hereby incorporated by reference in its entirety.

FIELD OF THE INVENTION

The present invention relates generally to electronic photography, and more particularly to a system and method for enabling a user to easily store and retrieve one or more images taken by a digital camera on an archival image storage system.

BACKGROUND OF THE INVENTION

The present invention relates to electronic photography, and more particularly, to a system and method for enabling a user to easily select and enhance one or more images taken by a digital still camera for printing without using a personal computer or some other complex user interface.

Digital still cameras (DSCs) are rapidly gaining popularity with consumers. They permit high resolution color images to be stored for subsequent printing by conventional ink jet and laser printers. The quality of the color prints that are produced approaches that of conventional silver halide photographic prints. More importantly, the digital images can be permanently stored on different forms of media such as compact disks (CDs), manipulated and altered in a personal computer (PC), inserted into computer graphics and word processing programs, sent to friends and relatives via e-mail, and transmitted over the Internet as part of web pages. From an environmental standpoint digital still cameras are attractive because they eliminate the need for chemical developer solutions.

Commercially available digital still cameras typically have a removable data storage media such as floppy diskette or a flash memory card onto which the digital representation of the images captured by the camera optics and charge coupled device (CCD) can be stored. These forms of media may be removed and plugged into a personal computer so that the digital representations of the images may be viewed. The personal computers may be provided with digital still camera image processing software for enhancing the color balance, contrast, borders and other characteristics of the images prior to storage, printing or transmission. Typically the image processing software that runs on the personal computer allows certain images to be selected and others discarded or ignored.

Other digital still cameras have been developed that may be coupled directly to a printer. These cameras are desirable for consumers who do not own personal computers or feel uncomfortable using such computers. The command buttons and graphical user interface (GUI) menus on such a camera's liquid crystal display (LCD) are used in accordance with a pre-programmed protocol to select the images to be printed. This type of digital still camera image selection and printing system has the advantage of not requiring a personal computer. It is normally undesirable to print all images, because some are usually poor in quality, and printing all images results in wasted time, paper and ink or laser toner. However, the user is faced with a complex and bewildering set of commands for selecting, downloading and printing images. As an alternative, the printer itself can be provided with a user interface for selecting images from a digital still camera. However this is undesirable because the printer ends up having user-unfriendly interface software. With either approach for coupling a digital still camera directly to a printer, without a PC interface, it is very tedious and cumbersome to vary the characteristics of the selected images to be printed, such as size, brightness, cropping, etc. For the sake of simplicity, such characteristics, along with others, are generally referred to herein as something that will "enhance" the original image taken by the digital still camera.

Users frequently wish to archive in electronic form all or some of the digital images stored in the camera or on the removable storage media. Archiving the images on an archival image storage system allows the images to be erased from the camera and the removable storage media, so that the camera can be used to take a new set of photos. The archived images can be retrieved as desired at a future time from the image storage system for printing, e-mailing, incorporating into web pages, or other applications.

It would therefore be desirable to provide a system and method for enabling a user to easily select one or more images taken by a digital camera for storage to, or retrieval from, an archival image storage system or medium without requiring complex user interactions with the image storage system

SUMMARY OF THE INVENTION

In a preferred embodiment, the present invention provides a method for retrievably storing digital image files onto a storage device. The invention uses a combination order and proof sheet to provide a simple mechanism for users to select the images they want to store or retrieve. The method for storing includes forming one or more identity markers which, as a whole, identify a set of digital image files associated with the proof sheet, and printing the proof sheet. The proof sheet contains a printed image representing each of the image files; one or more user designation areas markable by the user to select which of the image files will be stored; and the identity marker or markers. The user designation areas preferably include a markable image selection area associated with each image file to select the associated image file, and a storage selection area markable to specify the storage operation to be performed. Possible storage operations include storing all of the image files on the proof sheet, storing only the selected image files, and storing none of the image files. After the proof sheet is printed, it is marked by the user and then scanned to detect the markings in the user designation areas. Those image files which are indicated by the markings are then stored onto the storage device. The storage device may be a hard disk, a CD-ROM, a CD-Rewriteable disk, a file server, or the like.

Each identity marker may also include identification information sufficient to identify the printer or other apparatus which printed the proof sheet, such as the manufacturer of the printer, the model of the printer, the serial number of the printer, a user account associated with the printer, or any combination of these. The marker may be printed as alphanumeric characters or as a non-alphanumeric pattern which frequently is a binary pattern having printed bit markers representing a first binary state and unprinted bit markers representing a second binary state.

As part of forming each identity marker, a data key is formed for each of the image files represented on the proof sheet. The data key may be formed by processing the image file itself so as to calculate the data key, preferably by performing a cyclic redundancy check on the contents of the image file. Alternate versions of the data key may be based on an index number provided by the printer. Some versions of the data keys may include the identification information for the printer. The data keys are printed as data key representations in the identity marker(s). In addition, the data keys themselves may be stored on the storage device in such a way as to be associated with corresponding image files, or may be embedding in the corresponding image file on the storage device. Each data key may also be used to form a file specifier defining the location on the storage device where the image file is stored.

Another preferred embodiment of the invention is a method for retrieving selected image files from a storage device. The method for retrieving includes providing a preprinted proof sheet having image selection areas associated with corresponding image files and corresponding predetermined data keys representations. At least one of the image selection areas on the proof sheet is marked to identify the corresponding image file or files to be retrieved. The marked proof sheet is scanned, and the marked image selection areas determined, and their corresponding data key representations identified. The data key representations are converted into data keys, which are then used to retrieve the image files associated with the marked image selection areas from the storage device.

Each of the data key representations has a printed pattern. To identify and convert each printed pattern to the corresponding data key, each data key representation is located on the marked proof sheet, the printed pattern read, and the pattern converted into the associated data key.

In some embodiments, retrieving the image files is done by converting each of the identified data keys into a file specifier, and reading from the storage device the image file corresponding to each file specifier. In alternate embodiments, retrieving is done by sending the identified data keys to a file server, and locating the image files associated with the identified data keys on the server. Locating may alternatively be done by generating internal data keys from the image file content of certain image files on the server, comparing the internal data keys generated by the server to each of the identified data keys provided to the server; and providing from the server those image files for which the internal data keys match the identified data keys.

Once the desired files are retrieved, the method may further performing an specified operation on each of the image files, such as printing the image file.

BRIEF DESCRIPTION OF THE DRAWINGS

The above-mentioned features of the present invention and the manner of attaining them, and the invention itself, will be best understood by reference to the following detailed description of the preferred embodiment of the invention, taken in conjunction with the accompanying drawings, wherein:

FIGS. 3A–3F illustrate a combination proof sheet and order form that may be utilized with the system of FIG. 1 to select one or more of an array of thumbnail images for final printing;

DESCRIPTION OF THE PREFERRED EMBODIMENT

Figure 1:
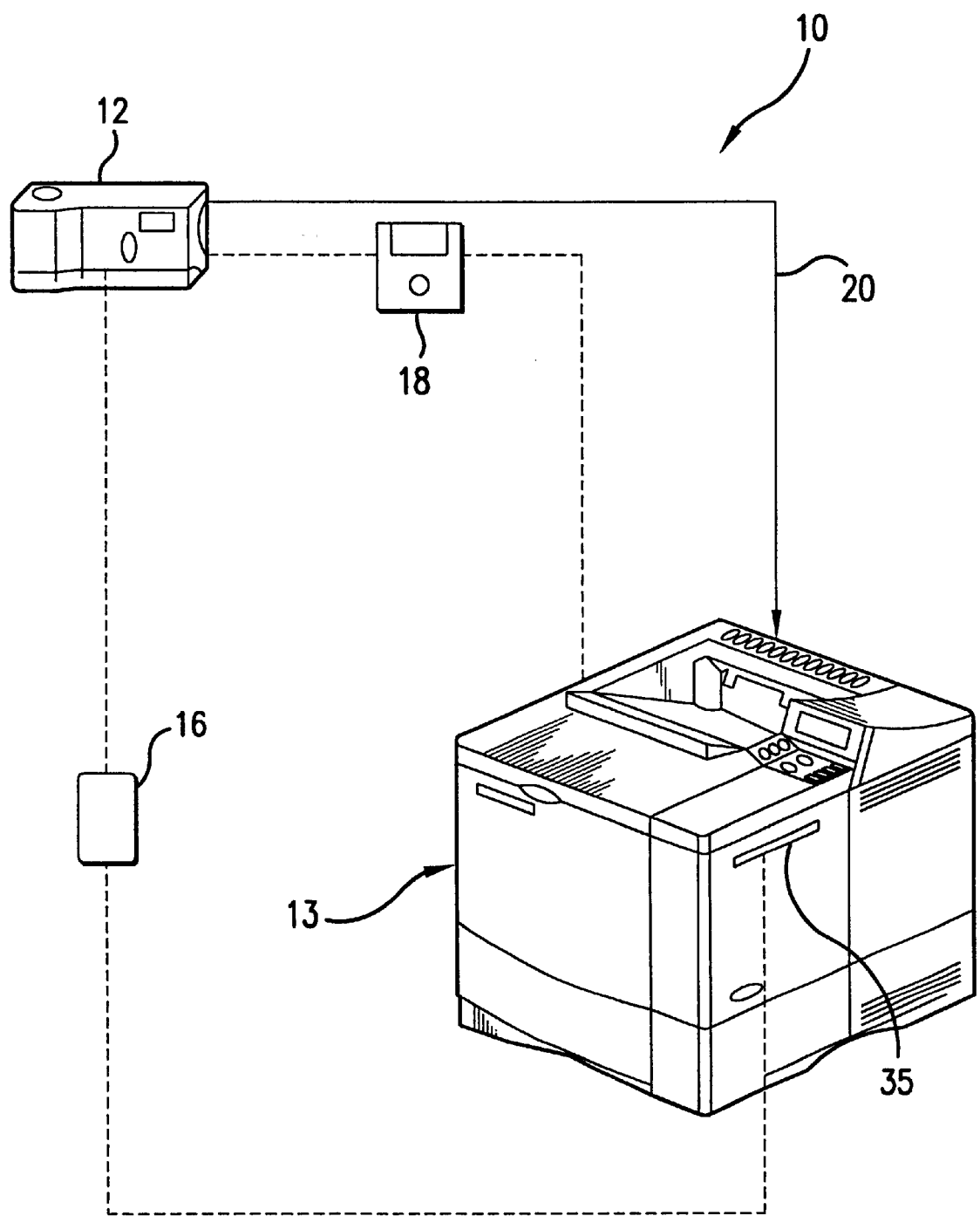
FIG. 1 is a diagrammatic illustration of a system for enabling a user to select and print digitally stored images in accordance with a preferred embodiment of the present invention.

Referring to FIG. 1, in accordance with the present invention a system 10 is provided for enabling a user to select and print digitally stored images. A conventional digital still camera 12 is used for taking and storing digital representations of a plurality of images. A laser printer 13 is used for generating graphical representations of selected ones of the plurality of images on a preselected print media. A flash memory card 16, floppy diskette 18, direct data link 20, wireless data link (not illustrated) or some other well known digital data transfer scheme is used to transfer the digital representations of the plurality of images from the digital still camera 12 to the laser printer 13.

Figure 3A:
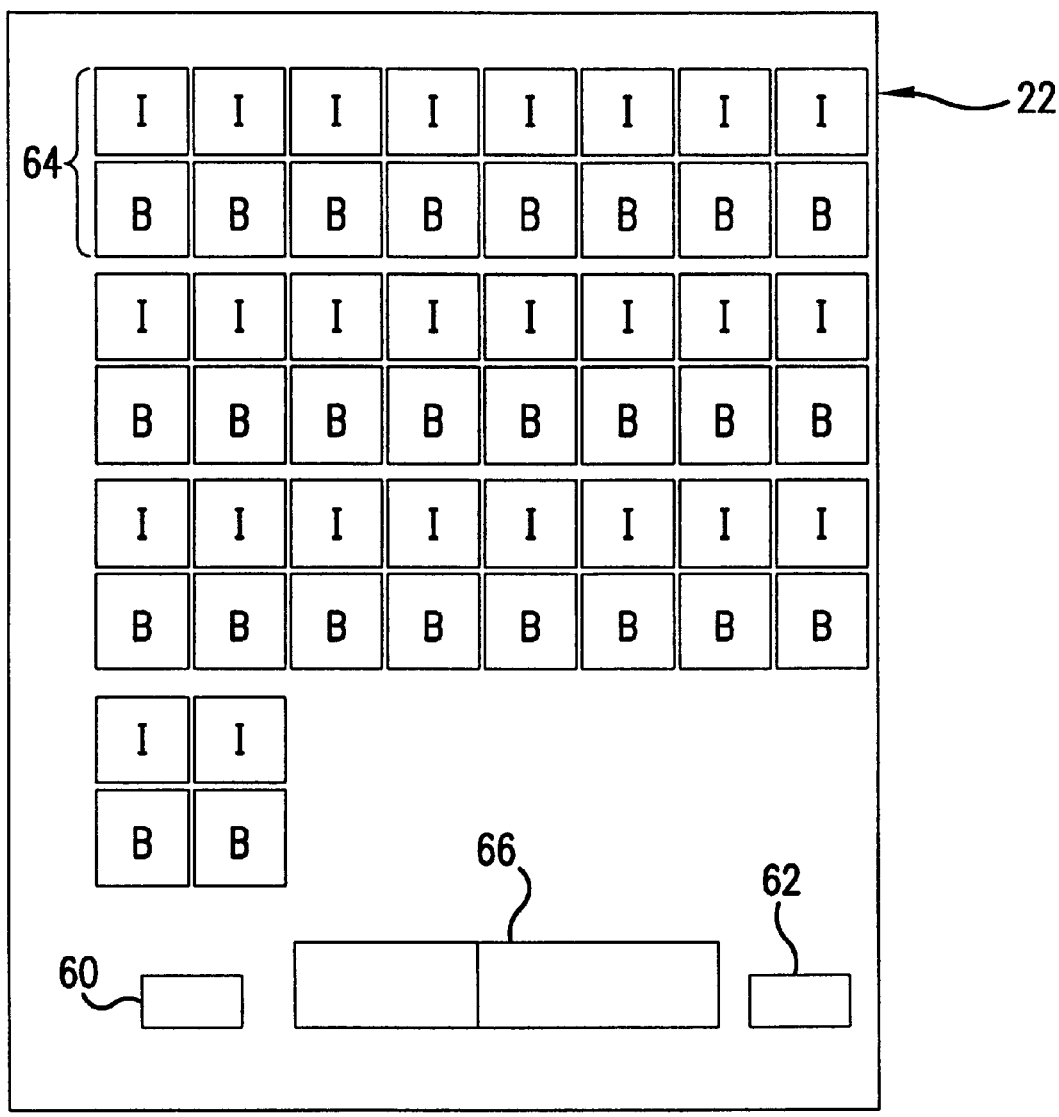

The laser printer 13 includes firmware programming for generating a combination proof sheet and order form 22 (FIG. 3A). As will be described later on in great detail, the combination proof sheet and order form 22 includes a graphical representation of at least one of the images and a plurality of image selection and/or image enhancement user designation areas.

It should be understood that the system of FIG. 1 can be used with an ink jet printer instead of a laser printer. Other types of printers could be utilized such as a dot matrix printer, dye sublimation printer, or thermal printer, provided they are capable of coloration and pixel density that will produce a suitable quality image. All that is necessary is that the printer have the electro-mechanical features, circuitry and firmware required to perform the functions described hereafter.

Figure 2:
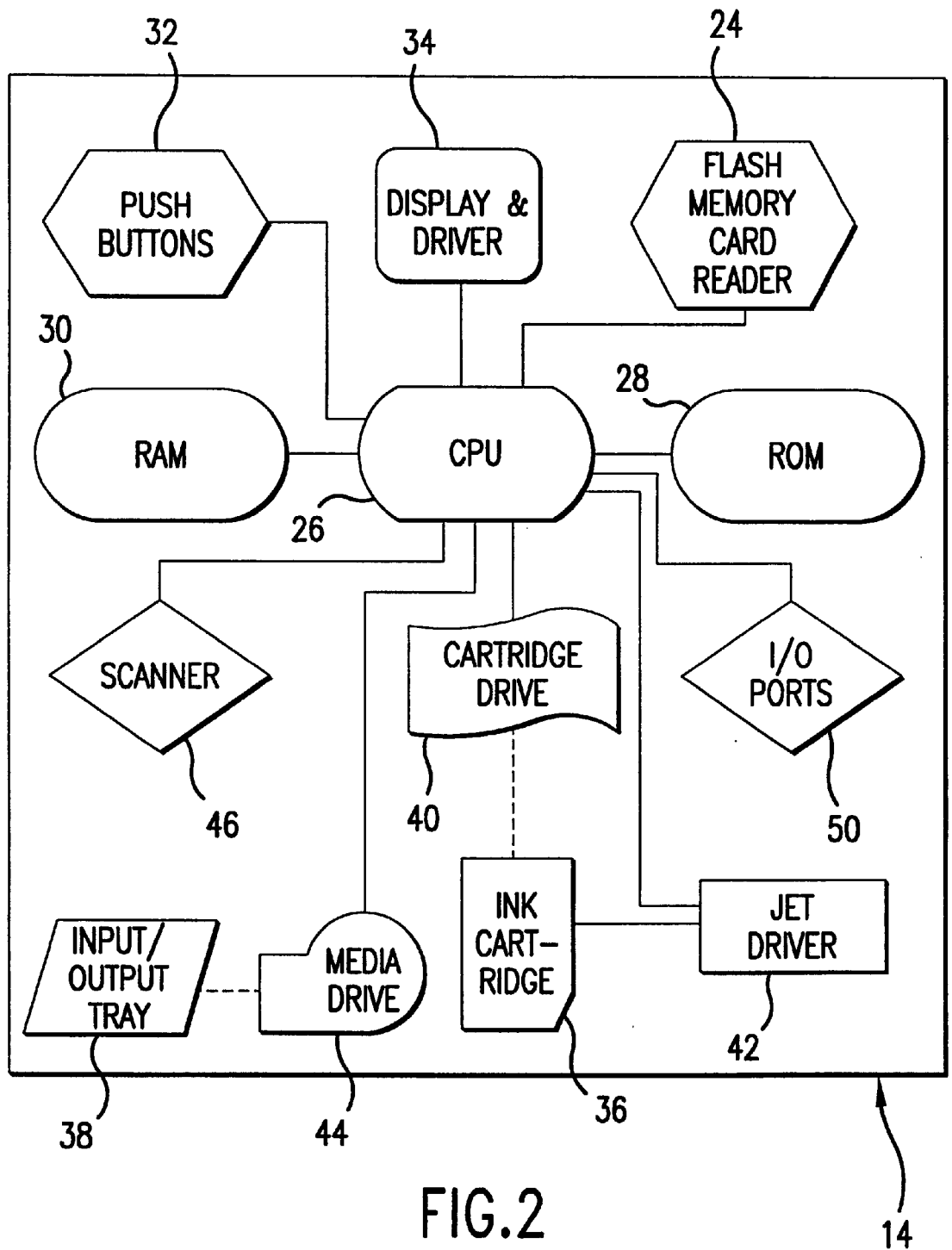
FIG. 2 is a functional block diagram of a printer that may be used in the system of FIG. 1.

FIG. 2 illustrates an ink jet printer 14, in functional block diagram form, that may be utilized in the system 10 of FIG. 1 in place of the laser printer 13. The ink jet printer 14 includes, for example, a reader 24 into which the flash memory card 16 may be removably inserted. Alternatively, the ink jet printer 14 could be equipped with a floppy disk drive or a wireless data transceiver. The flash memory card reader 24 is connected to a central processing unit (CPU) 26 which uses programs stored in a read only memory (ROM) 28 to download the digital representations of the images into a random access memory (RAM) 30. Pushbuttons 32 are manually selectively depressed by the user in a protocol directed by alphanumeric prompts, icons and/or other GUI indicated on an LCD display 34 and associated driver circuitry to cause the printer 14 to generate the combination proof sheet and order form 22 (FIG. 3A). In FIG. 1, the laser printer 13 has a slot or bezel 35 which allows insertion of the flash memory card 16 into a flash memory card reader.

An ink jet cartridge 36 (FIG. 2) is transversely reciprocated back and forth in the ink jet printer 14 while a sheet of print media such as plain paper located in an input/output media tray 38 is longitudinally advanced through the ink jet printer 14. An electro-mechanical cartridge drive mechanism 40 is controlled by the CPU 26 for moving the ink jet cartridge 36 transversely across the paper as required. The CPU 26 controls the ink jet cartridge 36 through a jet driver circuit 42. An electro-mechanical media drive mechanism 44 is connected to the CPU 26 for advancing the sheet of paper longitudinally through the ink jet printer 14.

The user manually completes selected user designation areas on the proof sheet and order form 22 (FIG. 3A), such as by marking thereon with a marking implement such as a pencil or a pen. This permits the user to select which images to send to final printing, image quantity, image brightness, image cropping, etc. The completed proof sheet and order form 22 is then manually re-inserted into the input/output media tray 38 (FIG. 2) of the ink jet printer 14. The user then pushes one or more of the push buttons 32 on the ink jet printer 14 to cause the media drive mechanism 44 to draw the now-completed form 22 from the tray 38 back through the ink jet printer 14. Alternatively, the printer 14 can detect the re-insertion of the order form 22 and automatically start printing the final print sheet(s).

Figure 5:
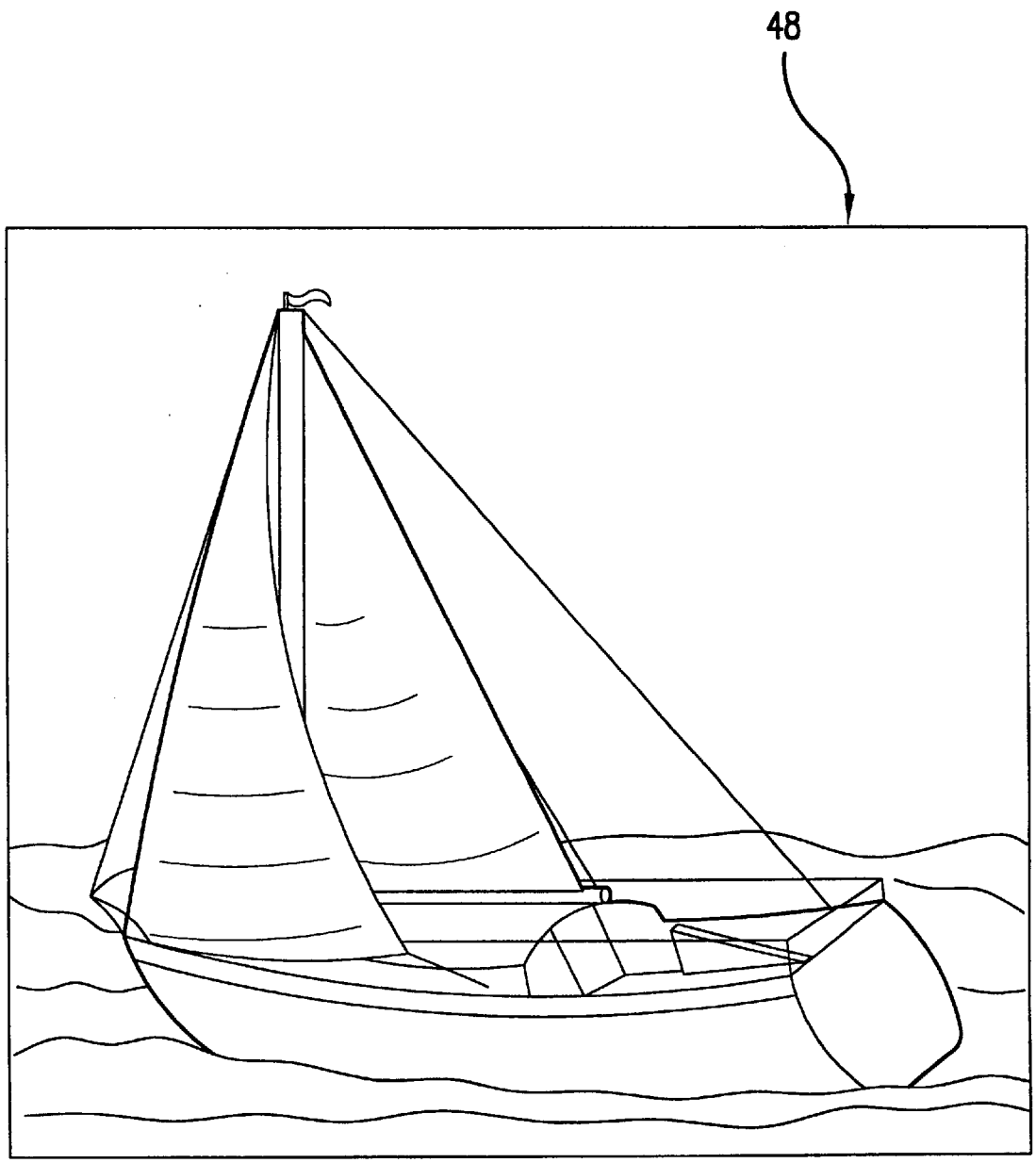
FIG. 5 illustrates an exemplary final print sheet with an image having the size, brightness and cropping designated by the user on the custom proof sheet and order form of FIG. 4.

A scanner 46 (FIG. 2) including circuitry and software is mounted in the ink jet printer 14. The scanner 46 may, for example, include a high intensity illumination source (not illustrated) and an array of photo detectors (not illustrated) mounted adjacent the path of the proof sheet and order form 22 as it is conveyed longitudinally through the ink jet printer 14. Alternatively, the scanner 46 can incorporate the exiting paper edge sensors that are already in some printer. Some ink jet printers have sensors for detecting the type of media and the activation energy for the ink jet pen. These sensors can be used to detect completed user designation areas. The scanner 46 is used to detect the user designation areas completed by the user on the proof sheet and order form 22. This information is conveyed to the CPU 26 for storage in the RAM 30. Programming stored in the ROM 28 is used by the CPU 26 to generate at least one final print sheet 48 (FIG. 5). As discussed hereafter in detail, the final print sheet or sheets have the images and enhancements (e.g. size, cropping, brightness, etc.) designated by the user on the combination proof sheet and order form 22.

The ink jet printer 14 (FIG. 2) is also provided with a plurality of input/output (I/O) ports 50 for connecting cables such as the direct data link 20 to the digital still camera 12 (FIG. 1) and to a personal computer (not illustrated). The ink jet printer could have a wireless data transceiver for communicating with the digital still camera, such as an infrared based system widely used with 8 mm VCR cameras to communicate with their remote controls.

FIG. 3A is a detailed plan view of an exemplary combination proof sheet and order form 22 that may be utilized with the system 10 of FIG. 1 to select one or more images from an array of thumbnail images such as 52 (FIG. 3C) for final printing. By way of example, there are twenty-five thumbnail images labeled "I" in FIG. 3A arranged in an array of four rows and eight columns on the form 22. The term "thumbnail" is a term of convenience used to describe printed graphical representations of reduced size and/or quality that are sufficiently small so that an array of the same can be printed on a single sheet of paper for simultaneous viewing and evaluation by a user. The thumbnail images I are preferably printed in color, although they could be black and white. They are made up of microscopic pixels of color pigment applied in a well known manner to achieve the image definition, tone, shading, resolution and other image characteristics required. The thumbnail image 52 and the image on the final print sheet 48 (FIG. 5) have been shown as line drawings due to the limitations imposed on permissible patent drawings. It will be understood that the thumbnail images I are typically of lower quality than the final print images. The thumbnail images are displayed in an array to allow the user to quickly and easily select which of the digitally stored images transferred from the camera 12 that he or she wants to print or save in final, higher quality form.

The combination proof sheet and order form 22 (FIG. 3A) includes image selection user designation areas such as 54 (FIG. 3C) adjacent each of the thumbnail images I. The user designation areas 54 include rows and columns of bubbles 56 that can be manually filled in by a user with a pen or a pencil. Other discrete regions could be utilized as user designation areas such as vertical stripes or slots between two adjacent vertical bars. The user designation areas could consist of discrete bounded regions in which a user could write in print or cursive form numbers, digits or symbols that could be read with optical character recognition (OCR) software. Alternatively, a user could punch out holes or apply stickers or conductive markers. Besides optical scanning, the printer could use electrical or mechanical detection of the completed user designation areas. The user designation areas 54 of the form 22 also include user readable printed indicia in the form of the column headings "Size" and "Qty" (quantity) in addition to row headings "3.5×5", "4×6", "5×7", "8×10" and "Cstm". The user designation areas are labeled "B" in FIG. 3A. The user can fill in one or more bubbles 56 in the user designation area B adjacent a particular thumbnail image I to "order" the desired number and size of final prints of that digitally stored image. Filling in the bubble next to "Cstm" causes the ink jet printer 14 to generate the custom proof sheet and order form 58 (FIG. 4) for that particular thumbnail image on a single sheet of paper. The layout and use of the custom form 58 will be described in detail later on.

Referring again to FIG. 3A, the combination proof sheet and order form 22 further includes a first identity marker 60 and a second identity marker 62. Each of these identity markers may take the form of a checkerboard grid as shown in FIGS. 3D and 3F. Each identity marker 60 and 62 has a unique pattern that is associated with the set of digital images that have been used to generate the proof sheet and order form 22. The markers 60 and 62 thus identify the contents of, for example, the flash memory card 16. When the completed form 22 is re-inserted into the ink jet printer 14, the identity markers 60 and 62 are scanned and compared to a code associated with the set of digital images currently stored in the printer 14 and/or flash memory card 16 residing therein. If there is no match, the user is warned via message on the display 34. This prevents the system from printing images and/or user designated enhancements from a reinserted form that do not correspond to the digital images currently available to the printer.

Figure 3E:
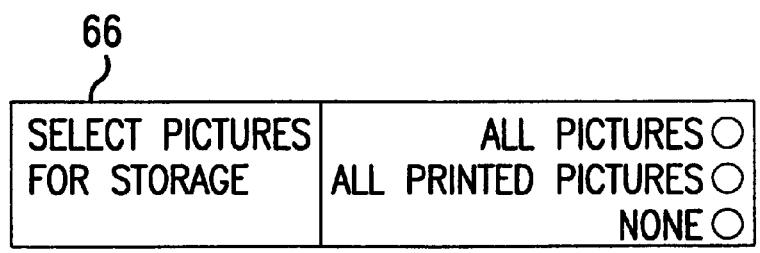

An "All Pictures" user designation area 64 (FIGS. 3A and 3B) is printed on the upper left corner of the form 22. It has no thumbnail image but has the Size and Qty indicia and associated bubbles to allow the user to order that all portrayed thumbnail images I be printed in particular sizes and quantities. Finally, the combination proof sheet and order form 22 also includes a "Select pictures for storage" user designation area 66 (FIGS. 3A and 3E) with associated indicia and bubbles. This feature allows the user to designate that all images, all images designated for final printing, or no images are to be permanently stored in the memory of the ink jet printer 14 or in a PC connected to the ink jet printer 14, or in some other permanent fashion.

The ink jet printer 14 could have a cache memory larger than that normally found in the camera 12 but smaller than the RAM memory of a PC connected to the ink jet printer 14. The ink jet printer 14 could be programmed to store the images transferred from the camera 12 and after reading the completed order form 22, transfer selected images to the PC for permanent storage when the printer detects that the PC has powered up. This empties the RAM 30 of the ink jet printer 14 for receiving new images.

Figure 4:
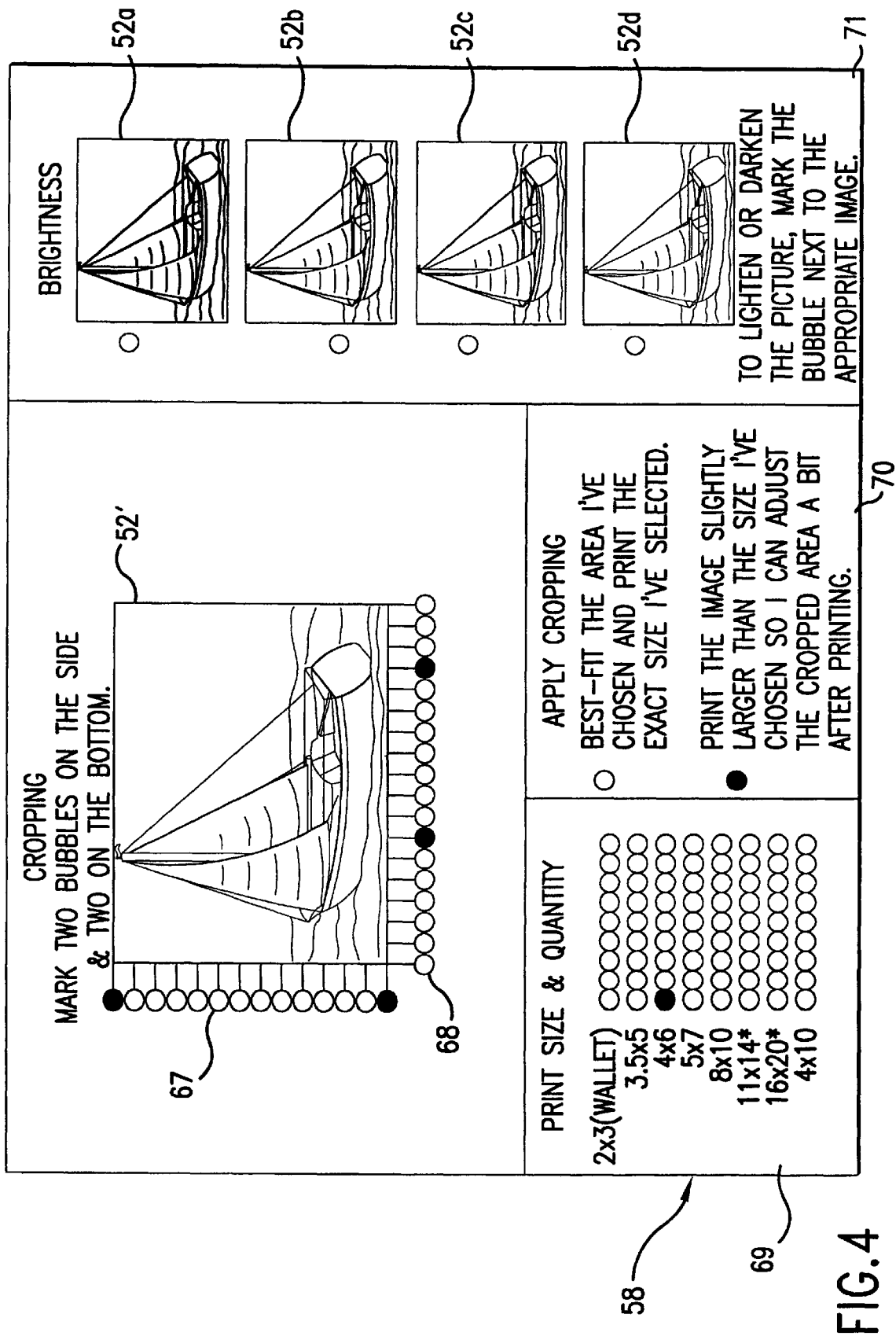
FIG. 4 illustrates a custom proof sheet and order form that may be utilized with the system of FIG. 1 in cropping a single image and selecting the brightness thereof for final printing.

FIG. 4 is a plan view of the custom proof sheet and order form 58 that may be utilized with the system of FIG. 1 in cropping a single image and selecting the brightness thereof for final printing. Print size, print quantity and picture brightness may also be selected via the custom order form 58. The custom order form 58 includes a substantially enlarged version 52' of the thumbnail corresponding image on the form 22 whose "custom" bubble 56 was previously filled in. Again the image 52' has been shown diagrammatically in FIG. 4 due to the limitations on the permissible form of patent drawings. In reality, the image 52' would be a graphical image printed on the form 58 via a complex pattern of tiny pixels. A series of equally spaced bubbles 67 and a series of equally spaced bubbles 68 along the left vertical and bottom horizontal side edges, respectively, of the enlarged image 52' may be filled in by the user to crop the image 52'. In FIG. 4 two of the bubbles 67 and two of the bubbles 68 have been filled in or darkened to give an example of the manner in which a user would designate cropping, which is one form of image enhancement described herein. The indicia or notation "Cropping—Mark two bubbles on the side & two on the bottom" appears above the enlarged thumbnail image 52' on the custom form 58.

The custom proof sheet and order form 58 (FIG. 4) further includes a "Print Size & Quantity" user designation area 69 similar to the user designation area 54 of the form 22 except that the former includes additional print sizes such as "2×3 (wallet)", "11×14", "16×20" and "4×10". In addition, the custom proof sheet and order form 58 also includes a user designation area 70 labeled "Apply Cropping". By filling in the appropriate bubble, this feature enables the user to best-fit the designated cropping to the selected print size. Such a feature is necessary because the rectangular proportions of the cropping selected by the user in filling in selected ones of the bubbles 67 and 68 along the borders of the enlarged thumbnail image 52' may not match the rectangular proportions of the print size selected with the user designation area 69. Alternatively, this feature enables the user to specify that the final print of the selected image should be larger than the print size selected so that further cropping can take place on the next printing or the user can simply use scissors to cut a print down to the desired size.

The custom proof sheet and order form 58 (FIG. 4) further includes a "Brightness" user designation area 71 on the right hand side thereof This area includes four thumbnail images 52a, 52b, 52c and 52d with progressively less brightness in the actual graphic printing of these images. The user fills in the bubble adjacent one of the four thumbnail images 52a, 52b, 52c or 52d to select the level of brightness desired in the final print using the different brightness levels depicted. Brightness is another form of image enhancement referred to herein.

Figure 6A:
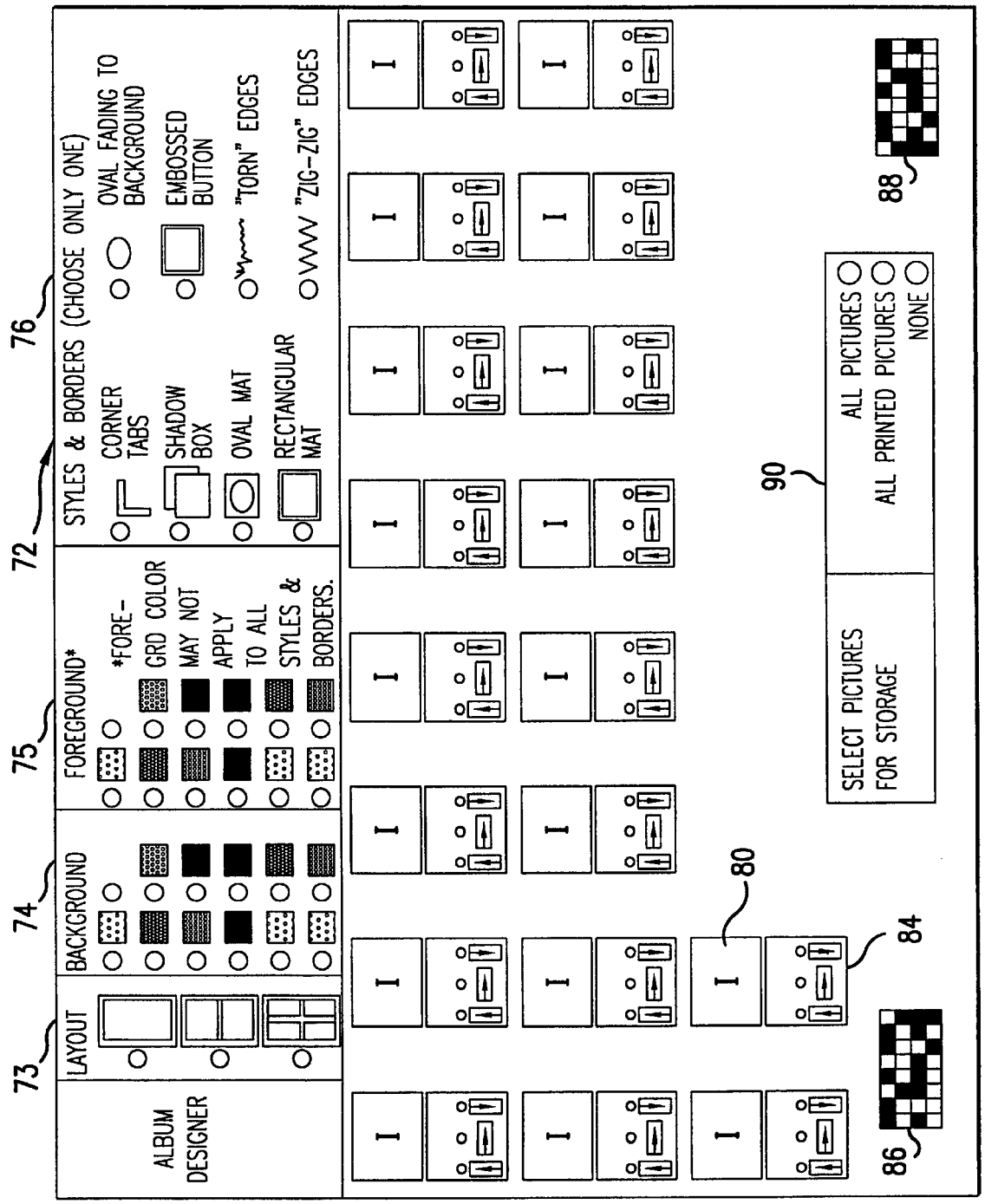
FIGS. 6A and 6B illustrate an alternate combination proof sheet and order form that may be utilized with the system of FIG. 1 in designing and printing pages for a digital photo album.
Figure 6B:
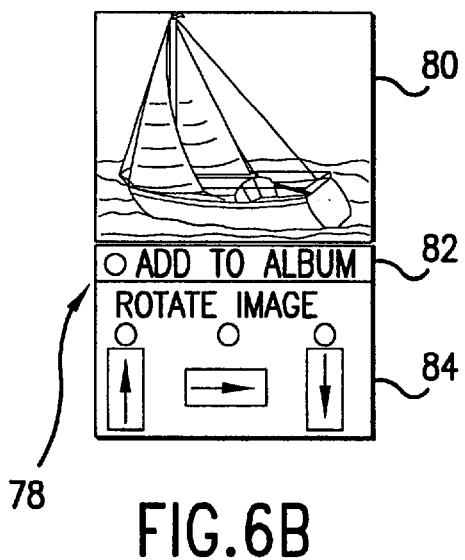

FIG. 6A is a plan view of an alternate proof sheet and order form 72 that may be utilized with the system of FIG. 1 in designing and printing pages for a digital photo album. The album form 72 is preferably printed on a single sheet of paper in response to the pressing of one or more of the push buttons 32 on the ink jet printer 14 or by filling in a bubble on one of the forms 22 or 58. The album form 72 includes user designation areas 73 for image "Layout", 74 for "Background", 75 for "Foreground"and 76 for "Styles & Borders". Each of these user designation areas presents relevant choice options, each having an adjacent bubble that can be filled in or completed to designate a choice. The choices available and their purposes are evident from FIG. 6A and need not be further described. The album form 72 further includes plurality of thumbnail images such as 80 (FIG. 6B) each having adjacent "Add to album" and "Rotate Image" designation options 82 and 84 for the corresponding thumbnail image. Again, due to the restrictions on patent drawings, the thumbnail images I cannot be shown in their true color graphical form in FIGS. 6A and 6B. The images are shown as boxes labeled I in FIG. 6A and as a line drawing in FIG. 6B. It will be understood that in FIG. 6A each thumbnail image I is shown with its adjacent user designation area below the same that permits the user to add the image to the album and rotate the same. Identity markers 86 and 88 (FIG. 6A) on the album form 72 serve the same function as the identity markers 60 and 62 (FIG. 3A) of the form 22. A "Select pictures for storage" user designation area 90 (FIG. 6A) on the album form 72 permits the user to select, by filling in the appropriate bubble, "All pictures", "All printed pictures" or "none" for permanent storage.

It will be apparent to those skilled in the art that other forms of image enhancement could be selected on the forms 22, 58 and 72 such as color balance. In addition, if date information has been stored when each image was taken, the user could designate on an order form that the final print is to include a superimposed picture date. Many other possibilities and combinations for image selection and/or image enhancement will occur to those skilled in the art and need not be specifically described herein.

Figure 7:
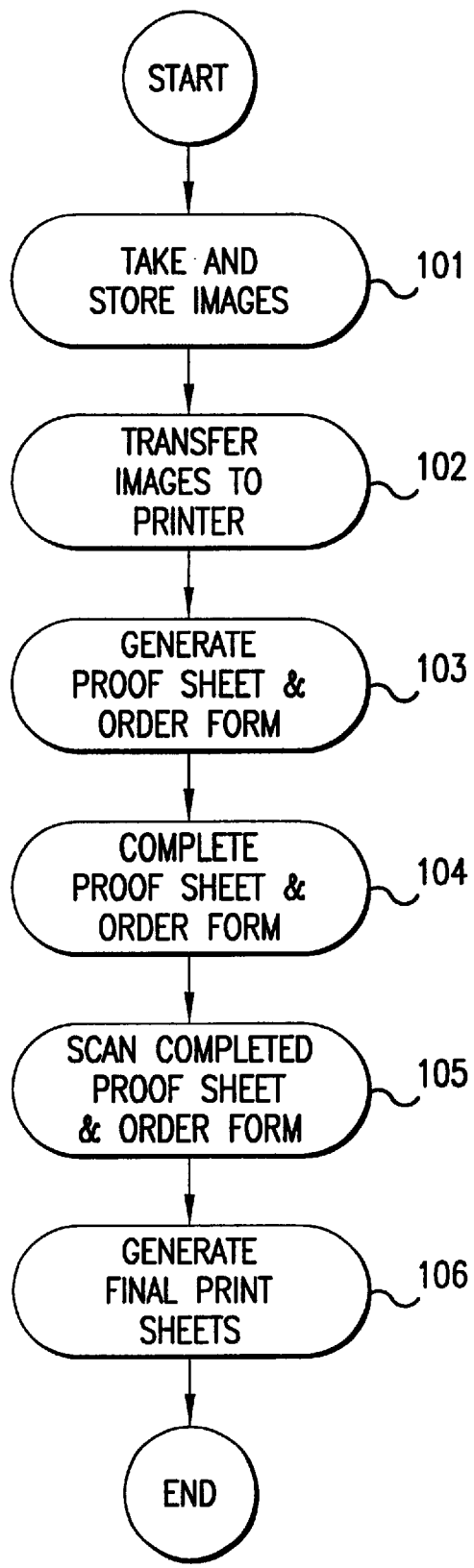
FIG. 7 is a flow diagram of the basic method of the method of the present invention for enabling a user to select and print digitally stored images.

In accordance with the present invention a method is also provided for enabling a user to select and print digitally stored images. Referring to FIG. 7, the method involves the following steps. The first step involves taking and storing digital still representations of a plurality of images. The second step 102 of the method involves transferring the digital still representations of the plurality of images to a printer capable of generating graphical representations of selected ones of the plurality of images on a preselected print media. The third step 103 of the method involves generating with the printer a combination proof sheet and order form including a graphical representation of at least one of the images and a plurality of image selection and/or image enhancement user designation areas. The fourth step 104 of the method involves completing at least one of the user designation areas on the combination proof sheet and order form. The fifth step 105 of the method involves using the printer to read the combination proof sheet and order form to determine the user designation areas completed by the user. The sixth and final step 106 of the method involves generating with the printer at least one final print sheet with the images and enhancements designated by the user on the combination proof sheet and order form.

FIG. 7 illustrates only a very top level view of our method. It will be understood that there are a wide range of subroutines and options that can be followed in selecting and printing digitally stored images. For example, the combination proof sheet and order form 22 of FIG. 3 could first be printed, completed, re-inserted into the ink jet printer 14 and scanned. The printer could then print a half dozen custom forms 58 (FIG. 4) which could then be completed and fed through the ink jet printer 14 in succession with final print images being printed in succession as ordered. Thereafter, the album form 72 (FIG. 6) could be completed and scanned.

Our invention thus provides a system and method for enabling a DSC user to quickly and easily decide what images to print, what size to print them in, and the number of prints of each image that are to be printed. The order form technique that we have developed is greatly advantageous in that it eliminates the need for the user to connect the DSC to a PC, while at the same time eliminating the need for a complicated and expensive GUI on the printer. Many DSC users are well familiar with filling out forms that include brief word instructions and bubbles for making selections in other aspects of every day life such as standardized test taking, survey responses, mail order catalog forms and the like. Our invention has the advantage of minimizing the amount of paper, ink and toner that would otherwise be consumed in prior camera-direct-to-printer systems which typically require all images to be printed. Our invention further has the added benefit of allowing sophisticated color photographic prints to be "ordered" quickly and easily, while at the same time being environmentally friendly by eliminating the use of developers and other chemicals associated with conventional silver halide photography.

Figure 8:
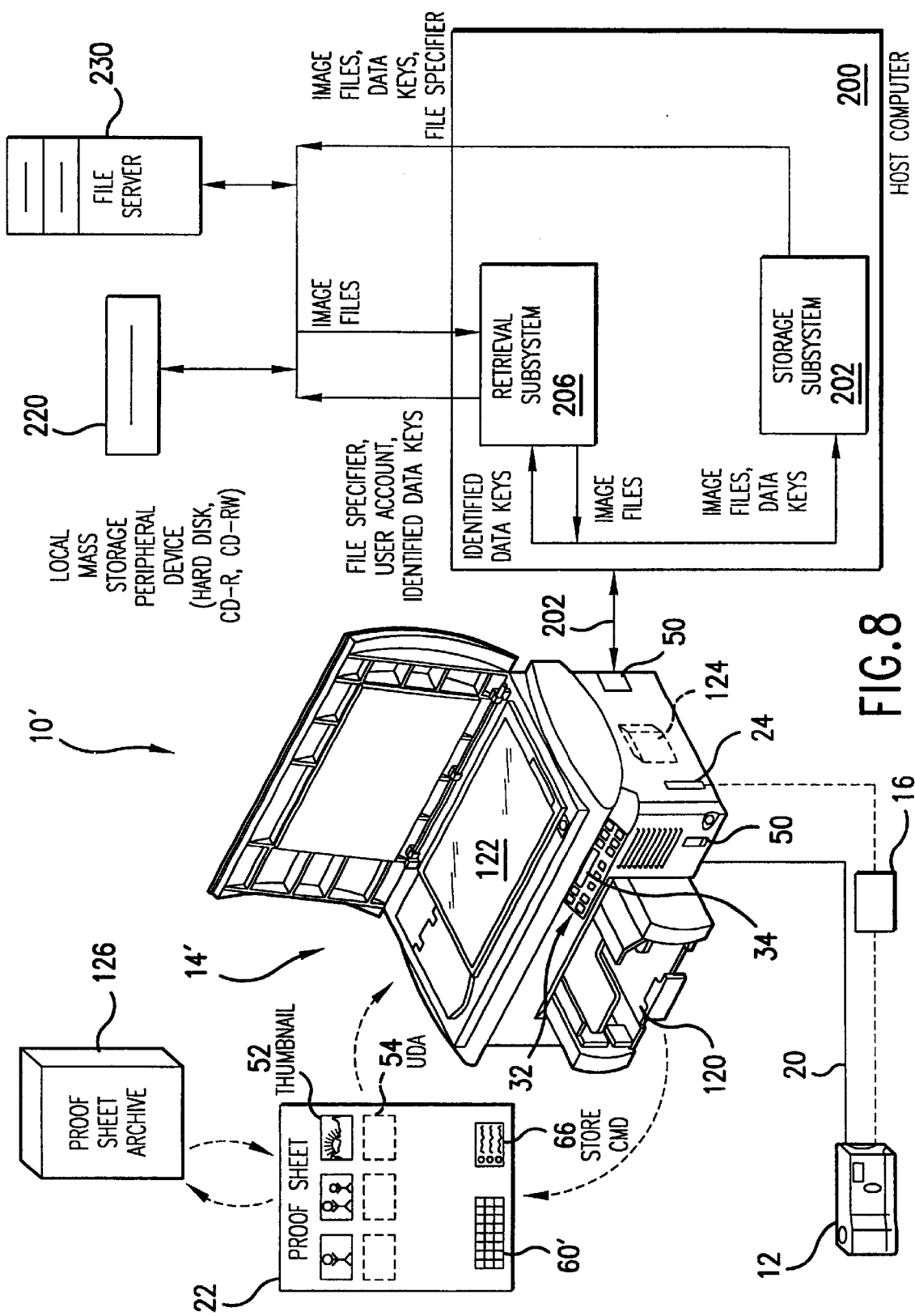
FIG. 8 is a schematic representation of an archival electronic image storage and retrieval system employing a user-designated proof sheet according to the present invention.

Considering now in further detail the storage and retrieval of digital images using the combination proof and order sheet 22, the sheet 22 can have one or more identity markers 60,62 which individually or collectively contain a unique pattern associated with the set of digital images used to generate the proof sheet 22. As best understood with reference to FIG. 8, the combination proof and order sheet 22 can be advantageously used in a system 10' according to the present invention so as to store and retrieve digital images. The system 10' includes a multifunction printer 14' having both printing and optical scanning capabilities operable either programmatically from a host computer 200 connected via a host computer link 202 to one of a plurality of I/O ports 50 on the printer 14', or manually by one or more of the pushbuttons 32 on the printer 14'. The multifunction printer 14' can print documents, including the proof sheet 22 and photo-quality prints of individual digital images, and deliver these documents to the print output tray 120 for retrieval by the user. A printed document, such as the user-completed proof sheet 22, can be placed on a scan platen 122 and optically scanned by the multifunction printer 14'. If a marked proof sheet 22 is placed on the scan platen 122, the multifunction printer 14' also detects and interprets the markings made by the user in the image selection user designation areas 54 and the "Select pictures for storage" user designation area 66, associates each of the individual image selection user designation areas 54 with a corresponding digital image using the identity marker 60', and carries out the operations specified by the user on the associated digital images. The printer 14' may contain another I/O port 50 to which a digital camera 12 can be connected via a direct data link 20, and a memory card reader 24 into which a memory card 16 removed from the camera 12 may be inserted. In addition, some printers 14' contain printer identification information 124 which may include the printer manufacturer, model number, serial number, and the like.

The system 10' further includes a data key generator (not shown), preferably implemented as a firmware module in the ROM 28 of the printer 14' which is executed by the CPU 26. However, the data key generator may alternatively be implemented as a software module in the host computer 200. The data key generator generates data keys corresponding to individual image files. Each data key, alone or in combination with other information, uniquely identifies the corresponding image file for storage and retrieval. As will be explained subsequently in further detail, each data key may be generated from the contents of the corresponding image file, or from an index number provided by the printer 14' which is unique to each image file. In some embodiments, a data key may also include the printer identification information 124, user account information for the file server 230, or both.

The system 10' also includes an identity marker generator (not shown), preferably implemented as a firmware module in the ROM 28 of the printer 14' which is executed by the CPU 26. However, the identity marker generator may alternatively be implemented as a software module in the host computer 200. The identity marker generator formats and prints the identity marker 60' on the proof sheet 22. As part of the formatting and printing, the identity marker generator formats and prints a representation of the appropriate data keys within the identity marker 60'. The data keys that are printed on the proof sheet 22 are the data keys for those image files that correspond to the thumbnail images 52 which are printed on the proof sheet 22. The identity marker 60' may further include the machine identification information 124 for the printer 14', or user account information, printed separately from the data keys. In operation, when a user presses a pushbutton 32 to print a combination proof and order sheet 22 for those images presently loaded into the printer 14' from the digital camera 12 or the memory card 16, the data key generator generates the data keys, and the identity marker generator then uses the data keys to print the identity marker 60' on the proof sheet 22.

Considering now in further detail the host computer 200, the computer 200 includes subsystems which operate in conjunction with the multifunction printer 14' to store digital images to, and retrieve them from, a mass storage device such as a local mass storage peripheral device 220 (such as a hard disk, CD-ROM disk, CD-Rewriteable disk, or the like), or a file server computer system 230. The subsystems on the host computer 200 include a storage subsystem 202 and a retrieval subsystem 206 which are preferably implemented as modules of a software program executed by the computer 200. However, other arrangements are contemplated by the present invention, such as having certain subsystems, or portions thereof, implemented in firmware or hardware of the multifunction printer 14' instead of the computer 200. In operation, the printer 14' invokes the subsystems 202,206 as required. For example, when the user places a marked proof sheet 22 on the scanner platen 122 and presses a pushbutton to scan the user-marked proof sheet 22, the printer 14' detects the user designation areas 54,66 and determines the operations requested by the user. If the user has marked the areas 54,66 to indicate that image files received by the printer 14' from the digital camera 12 or memory card 16 are to be stored, the printer 14' invokes the storage subsystem 202 to store the image files on the mass storage device. If the user has marked the areas 54,66 to indicate that image files previously stored on the mass storage device are to be printed, edited, or the like, the printer 14' invokes the retrieval subsystem 206 to retrieve the image files from the mass storage device.

Considering now in further detail the storage subsystem 202, the storage subsystem 202 preferably receives from the printer 14' the image files to be stored and the associated data keys. In an alternate embodiment, the storage subsystem 202 may generate the corresponding data key for each image file instead of receiving it from the printer 14'. In some embodiments, the storage subsystem 202 may embed the data key into the image file prior to storage, and/or convert the data key into a file specifier at which the image file will be stored. The image file, and in some embodiments the data key, are then stored on the mass storage device. If the mass storage device is a local peripheral 220, the image file is preferentially stored at the location indicated by the file specifier. If the mass storage device is a file server 230, the image file (and data key, if appropriate) are preferentially stored under the user account at a location selected by the file server.

Considering now in further detail the 206, the retrieval subsystem 206 receives from the printer 14' the data keys of the image files to be retrieved. If the image file was stored on the mass storage device at a file specifier derived from the data key, the data key is processed to again derive the same file specifier, and the image file is retrieved using the file specifier. If the storage location of the image file was left to the file server 230 to determine, the data key is sent to the file server 230 (along with the user account information) in order to retrieve the image file. The retrieval subsystem 206 then sends the retrieved image file to the printer 14' for printing, editing, or the like.

Figures 9A, 9B, 9C:
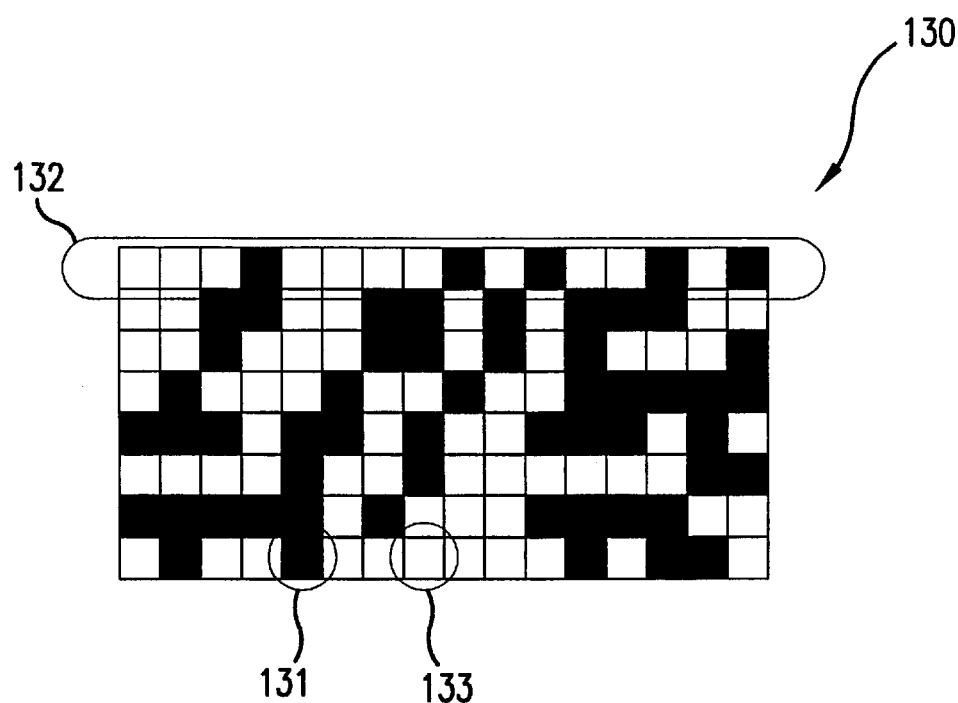
FIGS. 9A–9C are illustrative examples of alternative representations of an identity marker printed on the user-designation proof sheet of FIG. 8.
Figure 9D:
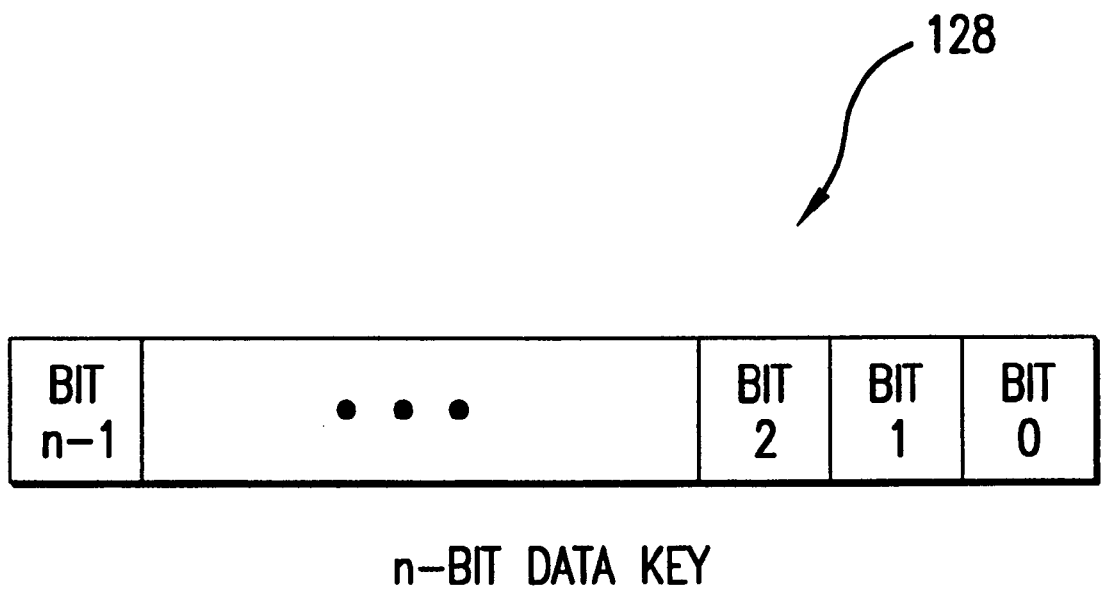
FIG. 9D is a schematic diagram illustrating the format of a data key, a representation of which is incorporated in the identity markers of FIGS. 9A–9C.

Considering now the in further detail, and with reference to FIG. 9D, each data key 128 is digitally represented as an n-bit number, the individual bits of which can be conventionally referred to as bit 0 (the least significant bit) through bit n–1 (the most significant bit). In a preferred embodiment, this n-bit number is generated by processing the contents of the corresponding image file. Preferably this processing includes performing a data reduction operation, such as a cyclic-redundancy check (CRC), on the contents of the image file. CRC algorithms are well known to those skilled in the art. Since the data keys 128 will be used to retrieve the image file at a later time, it is desirable to minimize the risk that a data key 128 will retrieve the incorrect file. Accordingly, the larger the value of n (i.e. the more bits in the data key), the lower the risk of improper file retrieval. In an alternative embodiment, the n-bit data key 128 is not derived from the image file contents, but rather is the next in a series of consecutively-numbered values maintained by the individual printer 14', such as an incrementing index number associated with the image.

If it is desired to further lower the risk of improper file retrieval, such as in situations where a very large number of image files will be stored on the storage device, or where image files from more than one printer 14' will be stored on the storage device, then the printer identification information 124, user account information for the file server 230, or both, can be incorporated into each data key 128, typically by appending a number of additional bits containing this information to the data key 128.

Considering now in further detail the identity marker 60', and with reference to the exemplary identity markers 130, 134, and 138 of FIGS. 9A–9C, the identity marker contains information sufficient to derive the data keys 128 for the image files displayed on the proof sheet 22 as thumbnail images 52. The exemplary identity markers 130,134,138 each specify eight data keys 128. Each n-bit data key 128 may be converted for printing purposes into a data key representation of a non-numeric graphical pattern, such as exemplary binary data key representation 132; or an alphanumeric printed pattern, such as exemplary hexadecimal data key representation 136. This conversion is preferentially performed by the printer 14', but could alternatively be performed by the host computer 200.

The patterns in each identity marker 60' can be arranged linearly, as illustrated by way of example in FIG. 9B; in a matrix, as illustrated by way of example in FIG. 9A; or in any other manner known to those skilled in the art. The size and shape of the alphanumeric characters and the non-numeric patterns are preferably chosen such that the identity marker 60' can be reliably located and converted back into the correct data keys 128 by the scanner 46. Alternatively, more than one identity marker, such as identity markers 60 and 62 of FIG. 3A, may be employed. The multiple markers may be identical, in order to provide redundancy in the event that a portion of the proof sheet 22 is damaged. The multiple markers may alternatively be mirror images or rotations of each other, sometimes with a certain portion marked differently so as to indicate whether or not the marker has a normal orientation or a mirrored orientation.

In some embodiments, the identity marker 60' may incorporate additional printed representations, such as exemplary representation 142, which represents the machine identification information 124 for the printer 14', or the user account information for the user's file server account.

Alternate embodiments may be used in order to reduce the size of the printed identity marker 60'. In the exemplary marker 138, where the data keys 128 are consecutively-numbered values such as an incrementing image index number assigned by the printer 14', it is not necessary to print all the data keys 128. Rather, the first-numbered data key 128 may be printed, such as exemplary data key representation 140, followed by a count of the total number of data keys 128 in the identity marker 60', such as exemplary data key count 144. Since each data key 128 is associated with a thumbnail image 52 printed on the proof sheet 22, and since the number of printed thumbnail images can be determined when the proof sheet 22 is scanned, some embodiments of the identity marker 60' may not include the data key count 144.

The identity marker 60' has a predetermined format that allows the individual data key representations within the marker 60' to be associated with a corresponding individual one of the thumbnail images 54, which is in turn associated with an individual image file to be stored or retrieved. This predetermined format is used for printing the proof sheet 22. Once the scanning system locates the identity marker 60' on a user-marked proof sheet 22, the predetermined format allows the printer 14' to locate the appropriate data key representation to be sent to the storage subsystem 202 or the retrieval subsystem 206.

Another embodiment of the present invention, as best understood with reference to FIGS. 10A through 10H, is a method 250 for retrievably storing a plurality of digital image files onto a storage device. The method begins at 252 by acquiring digital image files from an image source device, such as a digital camera 12 or a memory card 16. At 254, at least one identity marker 60' indicative of the digital image files is formed. At 256, an image representation for each image file, such as a thumbnail image 52, is printed on a proof sheet 22. At 258, at least one of the user designation areas 54,66 associated with the image representations on the proof sheet 22 is printed. At 260, the identity marker or markers are printed on the proof sheet 22. At 262, a copy of the proof sheet for use in retrieving the image files from the storage device at a future time is made. The proof sheets 22, or copies thereof, may be kept by the user in a proof sheet archive 126 for convenient access at a future time when file retrieval is desired. At 264, the user designation area or areas 54,66 on the proof sheet 22 are marked in order to select the image files to be stored. At 266, the marked proof sheet is scanned in order to detect the markings in the user designation areas 54,66. At 268, the user markings are process in order to identify the image files to be stored. Finally, at 270 the identified image files, as well as any supporting files needed for retrieval, are stored onto the storage device, and the method ends.

Figure 10A:
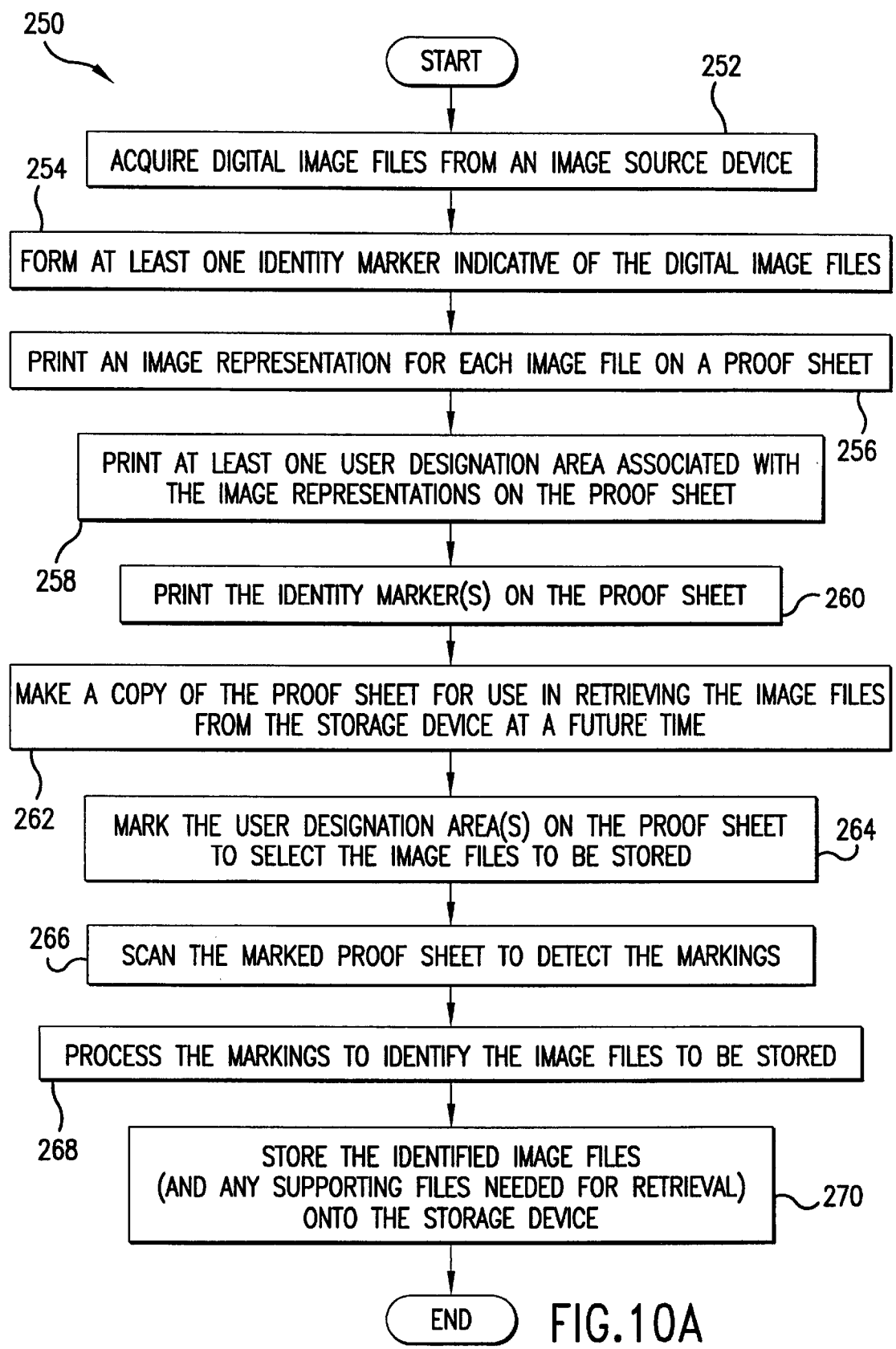
FIGS. 10A–10H are flowcharts of differing levels of a method of storing images on the archival image storage and retrieval system of FIG. 8.
Figure 10B:
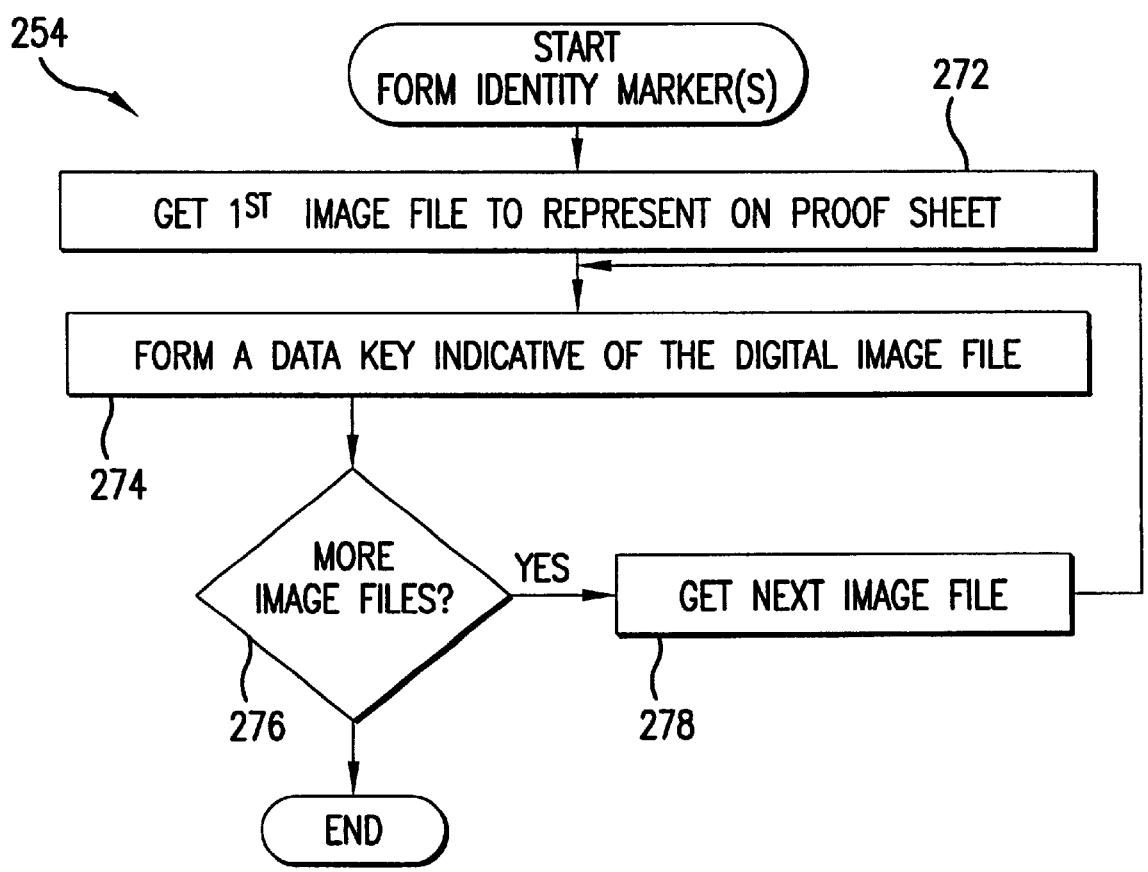

Considering now in further detail, with particular reference to FIG. 10B, the forming 254 of at least one identity marker 60' indicative of the digital image files, at 272 the first digital image file that is to be printed on the proof sheet 22 is obtained. At 274, a data key 128 indicative of the digital image file is formed. If there are more image files to be printed on the proof sheet 22 ("Yes" branch of 276), then at 278 the next digital image file to be printed on the proof sheet 22 is obtained, and the method continues at 274. If there are no more image files to be printed on the proof sheet 22 ("No" branch of 276), the forming 254 ends.

Figure 10C:
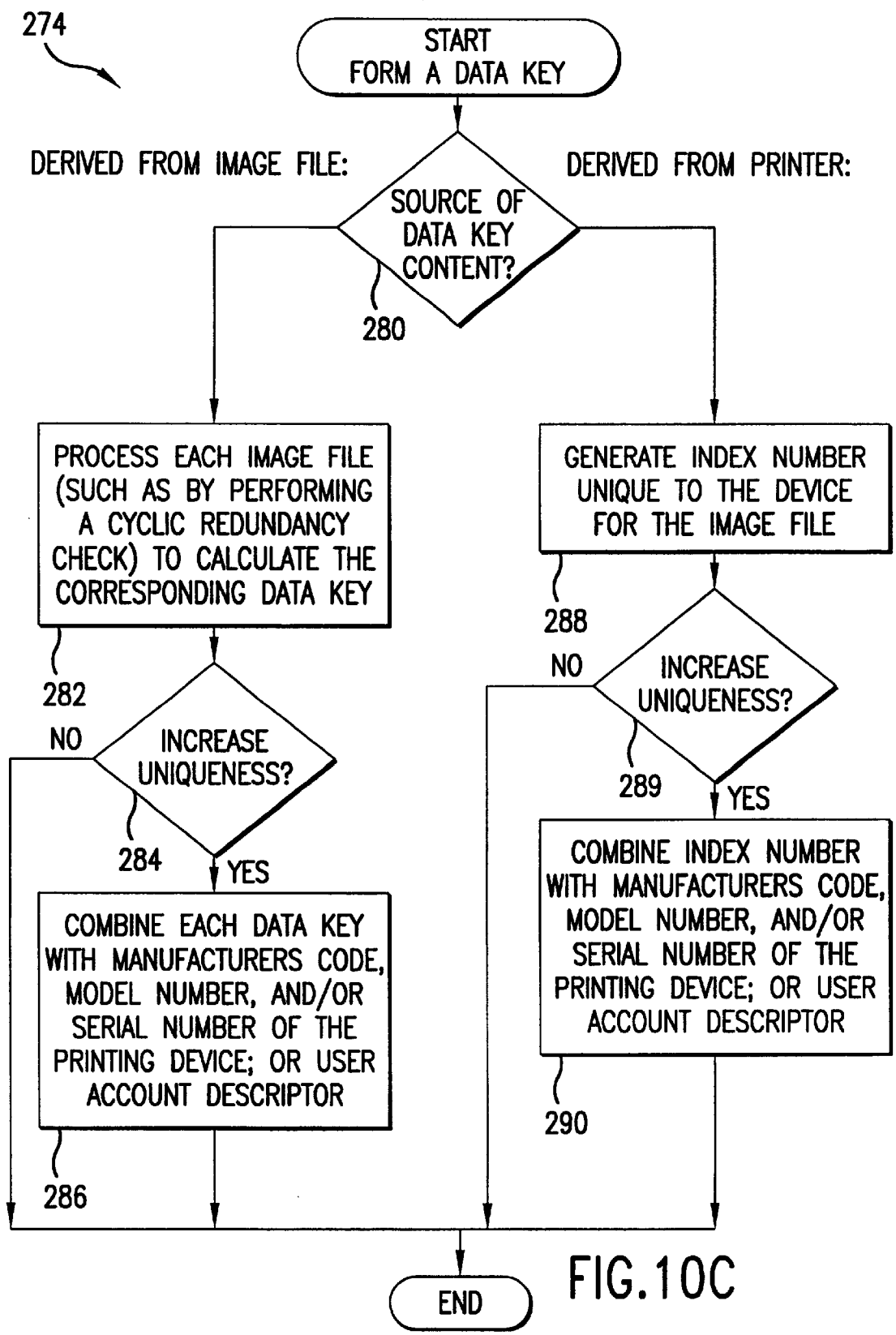

Considering now in further detail, with particular reference to FIG. 10C, the forming 274 of a data key 128 indicative of the digital image file, at 280 the source of the content of the data key is determined. If the content of the data key is determined from the content of the corresponding image file ("Derived from Image File" branch of 280), then at 282 each image file is processed to calculate the corresponding data key. As has been described heretofore, the processing preferentially includes calculating a cyclic redundancy check (CRC) value for the digital image file. If the resulting level of uniqueness provided by the CRC is adequate ("No" branch of 284), then the results may be directly used as the data key, and the forming 274 concludes. If an increased level of uniqueness is desired so as to further reduce the chances of an incorrect file retrieval in the future ("Yes" branch of 284), then at 286 the CRC value can be combined with some or all of the printer identification information 124, such as the manufacturers code, model number, and/or serial number of the printer 14', or with information descriptor of a user account on a file server 230. Then the forming 274 concludes. If the content of the data key is determined from information provided by the printer 14' ("Derived from Printer" branch of 280), then at 288 the printer 14' generates an index number, as has been described heretofore, for the data key 128. If the resulting level of uniqueness provided by the index number is adequate ("No" branch of 289), then the results may be directly used as the data key, and the forming 274 concludes. If an increased level of uniqueness is desired so as to further reduce the chances of an incorrect file retrieval in the future ("Yes" branch of 289), then at 290 the index number can be combined with some or all of the printer identification information 124, such as the manufacturers code, model number, and/or serial number of the printer 14', or with information descriptor of a user account on a file server 230. Then the forming 274 concludes.

Figure 10D:
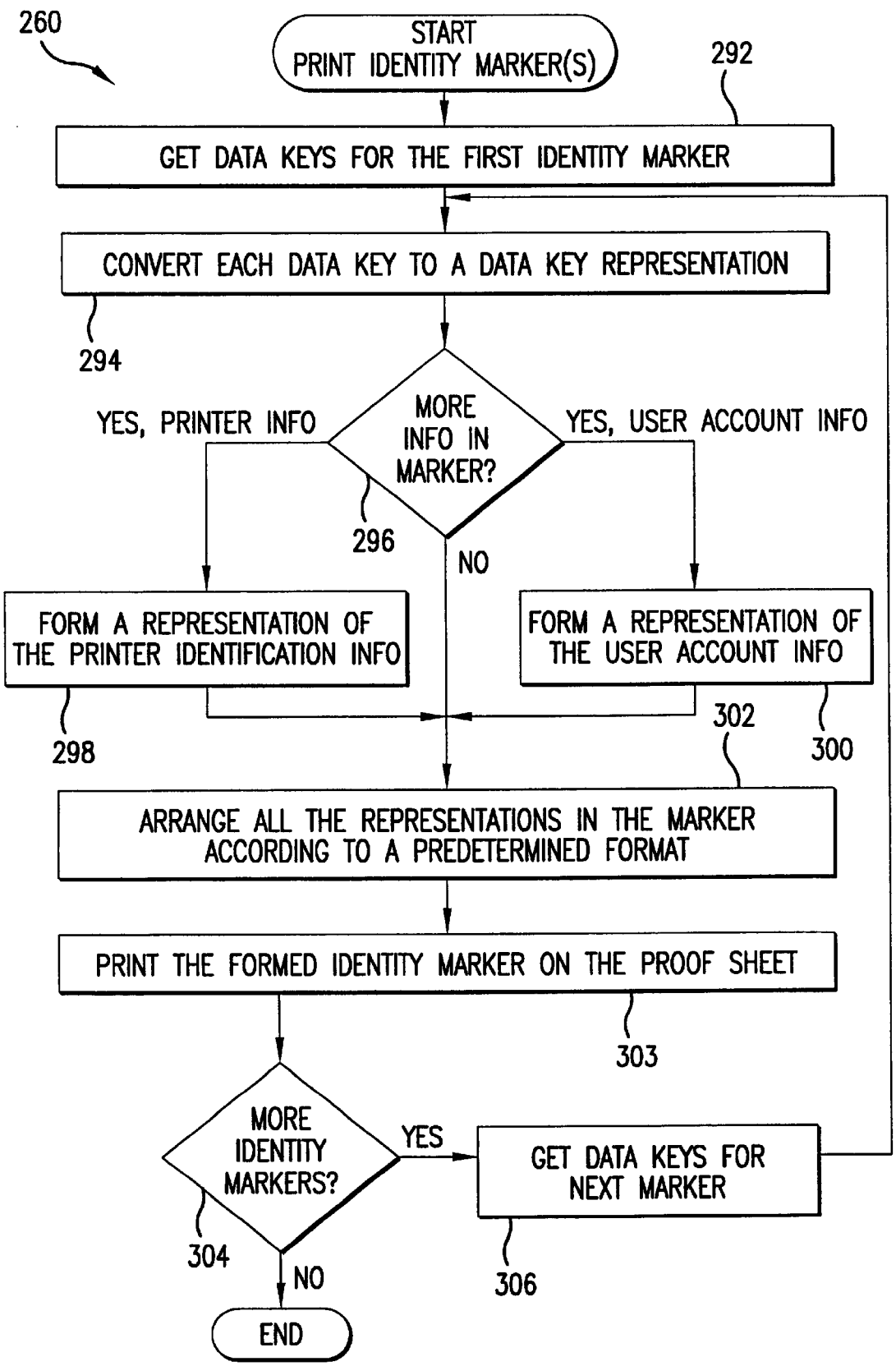

Considering now in further detail, with particular reference to FIG. 10D, the printing 260 of the identity marker or markers 60' on the proof sheet 22, at 292 the data keys for first identity marker 60' to be printed on the proof sheet 22 are obtained. At 294, each data key 128 is converted to a data key representation, such as exemplary representation 132, 136, as heretofore described. If additional printer information 124 is to be included in the data keys 128 ("Yes, printer info" branch of 296), then at 298 a representation of the printer identification information 124, such as the exemplary representation 142, is formed as heretofore described. If additional user account information is to be included in the data keys 128 ("Yes, user account info" branch of 296), then at 300 a representation of the user account information is formed as heretofore described. After the operations as 298 or 300 are performed, or if no addition information is to be included in the data keys 128 ("No" branch of 296), then at 302 all the representations in the marker 60' are arranged according to a predetermined format to form the identity marker 60' as indicated in the exemplary identity markers 130,134,138. At 303, the formed identity marker 60' is printed on the proof sheet 22. If there are more identity markers 60' to be printed ("Yes" branch of 304), then at 306 the data keys for next identity marker 60' to be printed on the proof sheet 22 are obtained, and the method continues at 294. If there are no more identity markers 60' to be printed ("No" branch of 304), the printing 260 concludes.

Figure 10E:
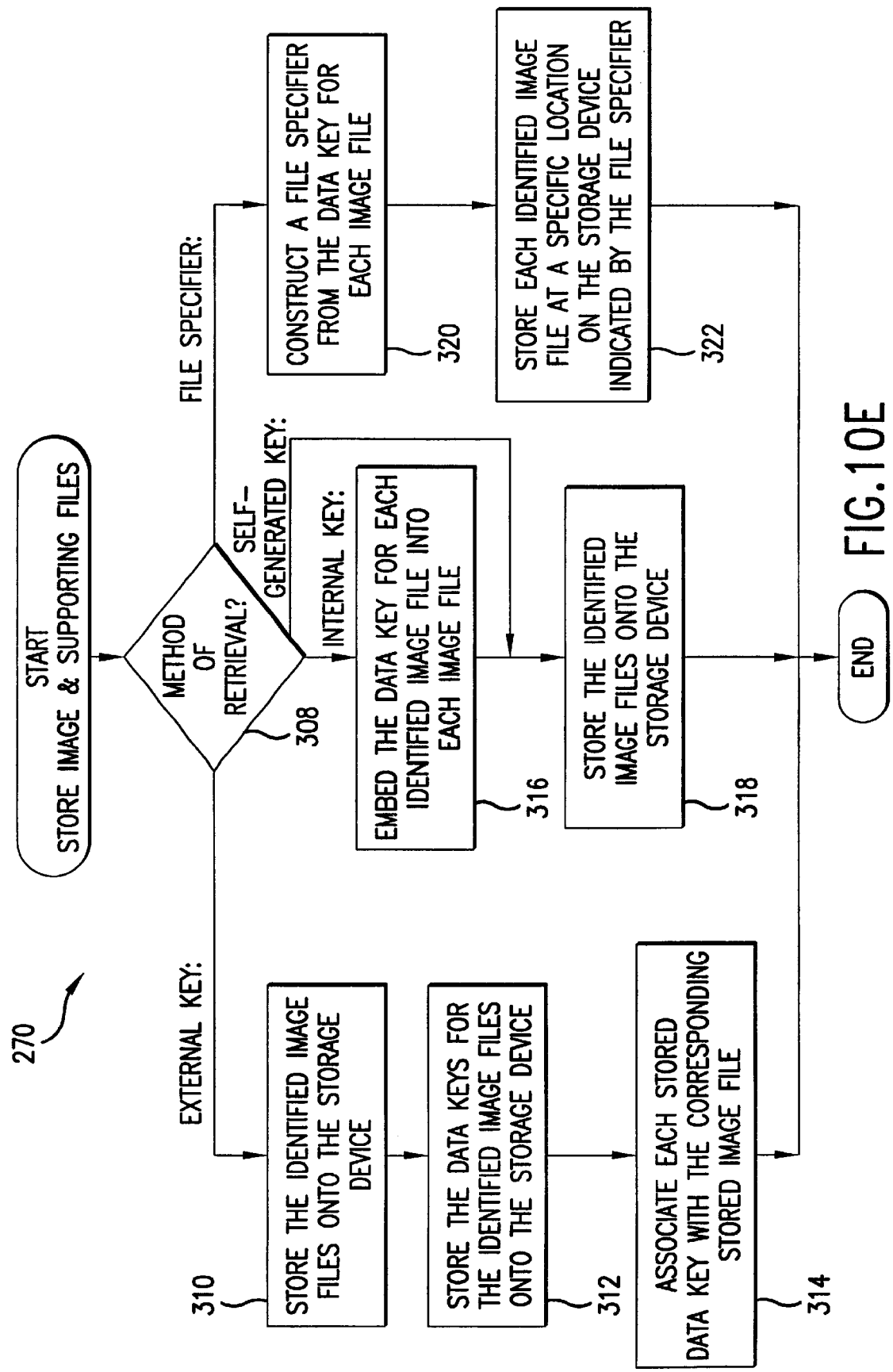

Considering now in further detail, with particular reference to FIG. 10E, the storing 270 of those image files identified for storage onto the storage device through user markings on the proof sheet 22, as well as any supporting files needed for their retrieval, at 308 the method of image file retrieval that will be used to retrieve the image file from the storage device at a future time is determined. If the retrieval method will use a data key 128 which is stored on the storage device separate from the image file ("External Key" branch of 308), then at 310 the identified image files are stored onto the storage device. At 312, the data keys for the identified image files are stored onto the storage device. At 314, each stored data key 128 is associated with the corresponding stored image file, and the storing 270 concludes. The associations are preferably implemented as a link file stored on the mass storage device, the link file containing a table of the associated data key 128 and image file pairs.

If the retrieval method will use a data key 128 which is stored on the storage device internally to the image file ("Internal Key" branch of 308), then at 316 the data key 128 for each identified image file is embedded into that image file. At 318 the identified image files are stored onto the storage device, and the storing 270 concludes.

If the retrieval method will calculate the data key 128 from the image file contents during the retrieval process ("Self-Generated Key" branch of 308), then at 318 the identified image files are stored onto the storage device, and the storing 270 concludes.

If the retrieval method will locate the file by using a file specifier derived from the data key ("File Specifier" branch of 308), then at 320 a file specifier is constructed from the data key 128 for each image file. The file specifier typically includes a logical location such as a directory pathname and a filename. At 322, each image file is stored at the location on the storage device indicated by the file specifier, and the storing 270 concludes.

Note that the above description of the storing 270 presumes that the files which are to be stored on the mass storage device are currently resident in or accessible by the printer 14'. As a result, the storing 270 may further include an error checking operation to ensure that the selected files are resident or accessible, and an error handling operation to continue or conclude the method in a logical manner should one or more files not be resident or accessible. Such operations are well known to those skilled in the art, and will not be discussed further hereinafter.

Figure 10F:
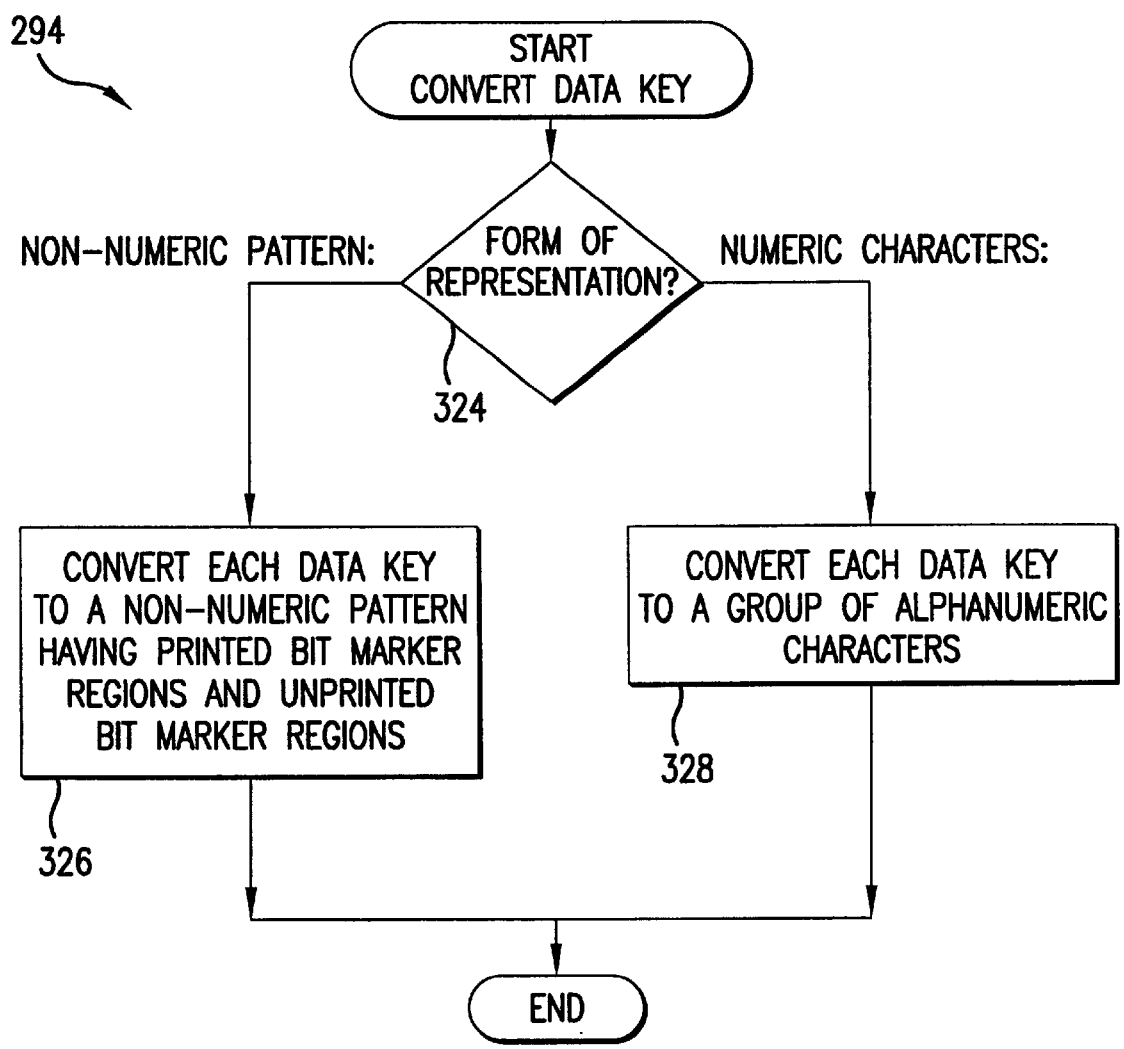

Considering now in further detail, with particular reference to FIG. 10F, the converting 294 each data key 128 to a data key representation, at 324 the form of the representation is determined. If the data key representation is as a non-numeric pattern such as the pattern of exemplary identity marker 132 ("Non-Numeric Pattern" branch of 324), then at 326 each data key 128 is converted to a non-numeric pattern such as exemplary data key 132, having printed bit marker regions 131 and unprinted bit marker regions 133, and the converting 294 concludes. If the data key representation is as a series of alphanumeric characters such as the pattern of exemplary data key 136 ("Alphanumeric Character" branch of 324), then at 328 each data key is converted to a group of alphanumeric characters representative of the data key, and the converting 294 concludes.

Figure 10G:
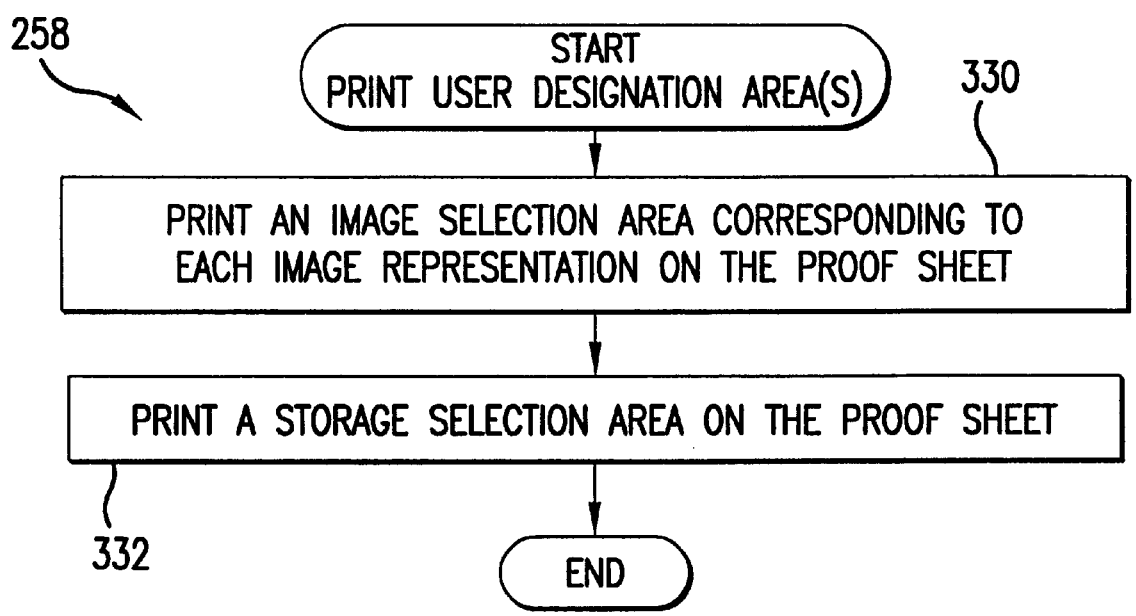

Considering now in further detail, with particular reference to FIG. 10G, a preferred embodiment of the printing 258 at least one user designation area 54,66, at 330 an image selection area 54 corresponding to each thumbnail image 52 is printed on the proof sheet 22. At 332, a storage selection area 66 is printed on the proof sheet 22, and the printing 258 concludes.

Figure 10H:
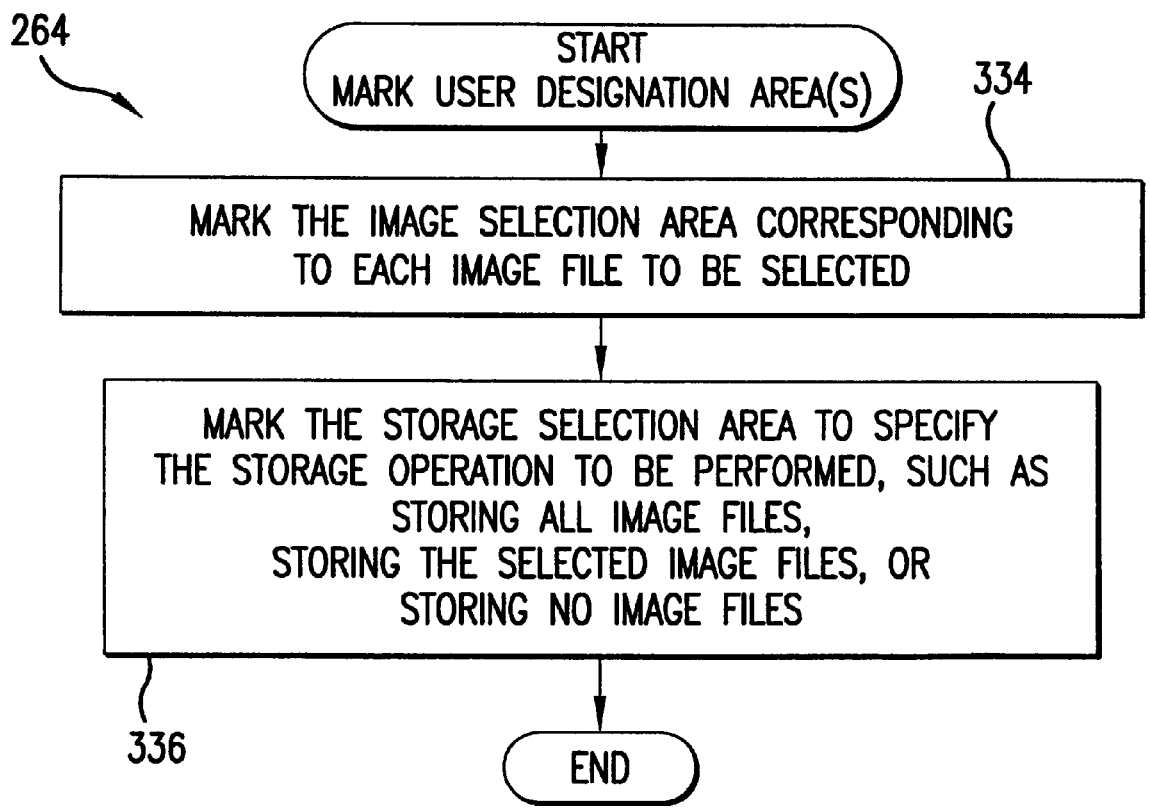

Considering now in further detail, with particular reference to FIG. 10H, the marking 264 of the user designation areas on the proof sheet 22 in order to select the image files to be stored, at 334 the image selection area 54 corresponding to each image file to be stored is marked. At 336, the storage selection area 66 to specify the storage operation to be performed is marked. In the preferred embodiment of the storage selection area 66, the user can specify that the image files corresponding to all thumbnail images 52 printed on the proof sheet 22 are to be stored; that only the image files corresponding to those thumbnail images 52 for which an operation has been marked in the corresponding image selection area 54 are to be stored; or that no image files are to be stored, but rather only that the operation marked in the image selection areas 54 are to be performed. These storage marking options just described are merely illustrative of the manner in which image file storage may be specified, and are not intended to limit the scope of the present invention to those particular marking options or modes of operation.

Figure 11A:
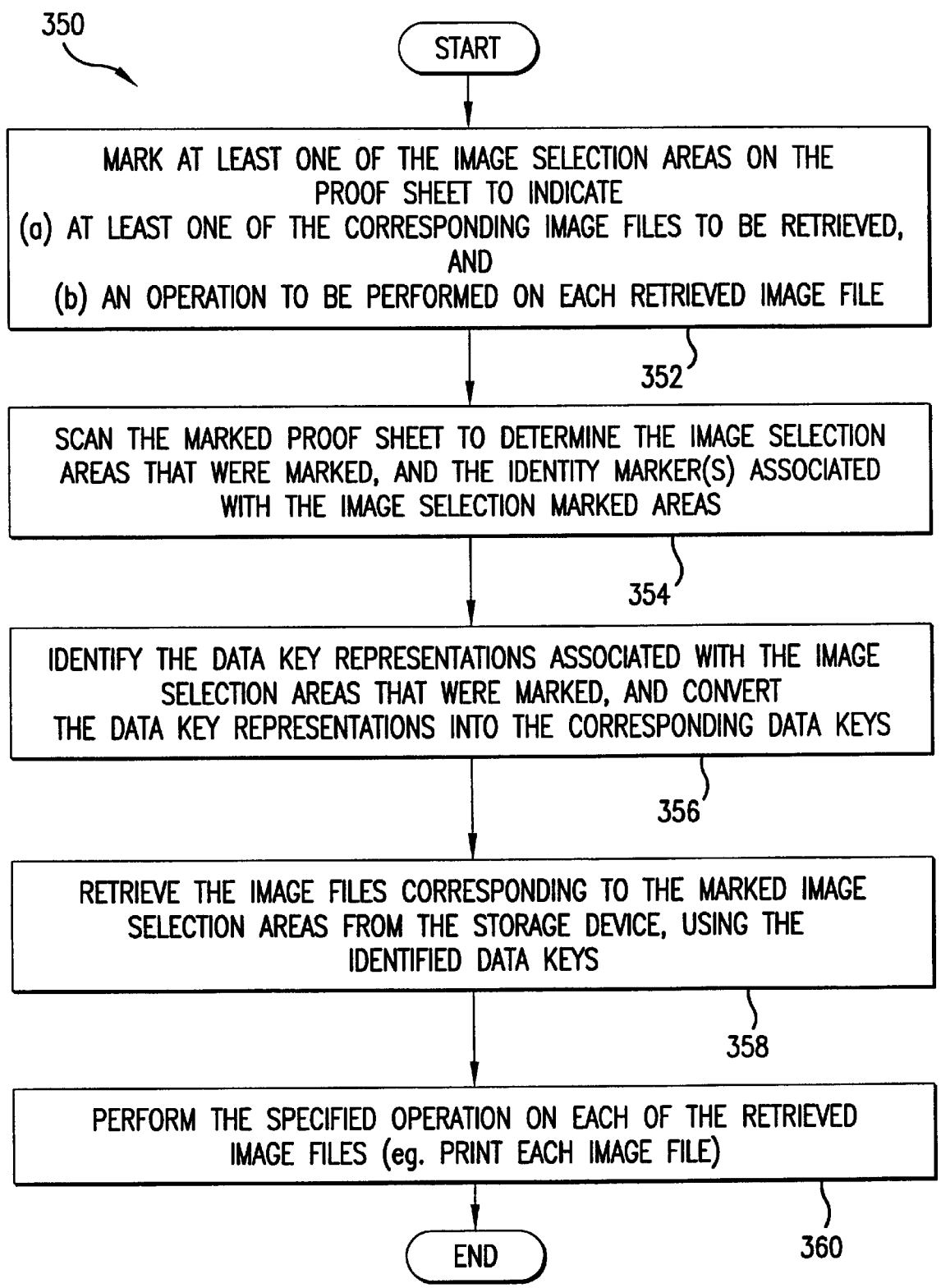
FIGS. 11A–11C are flowcharts of differing levels of a method of retrieving images from the archival image storage and retrieval system of FIG. 8.
Figure 11B:
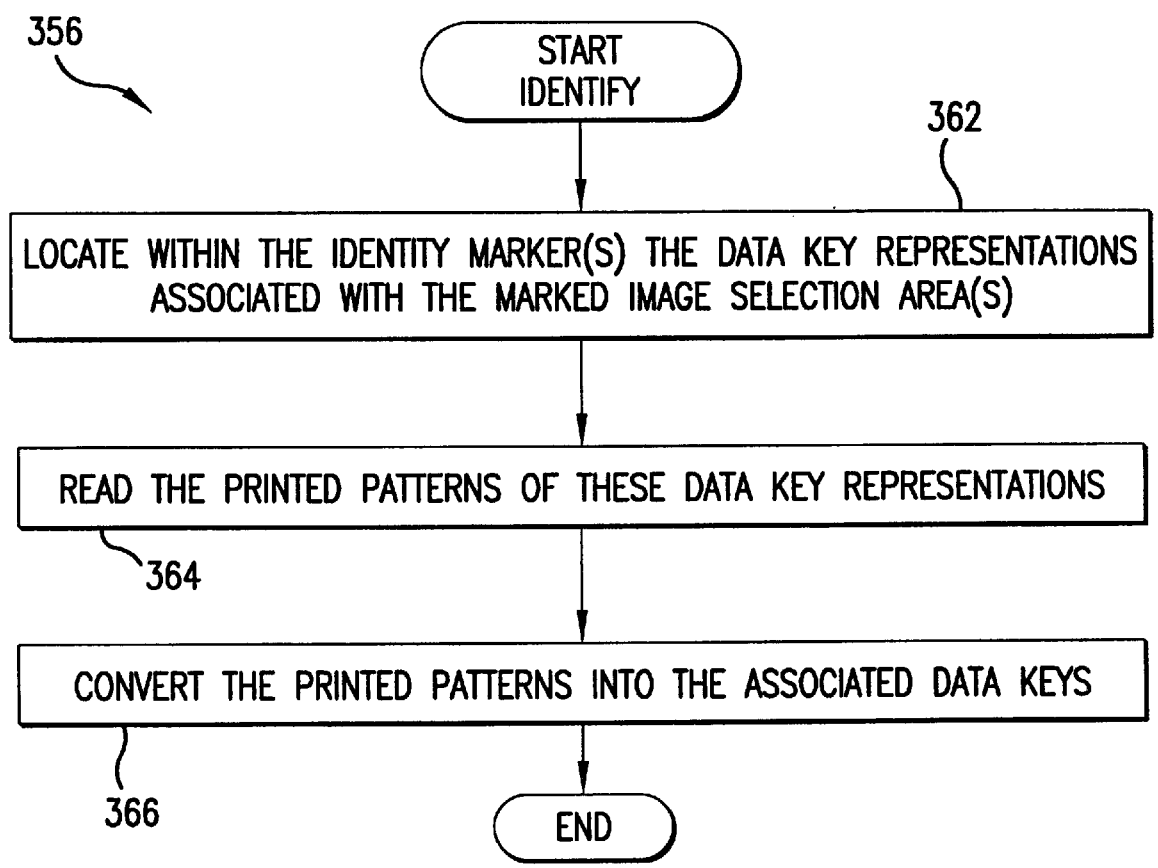
Figure 11C:
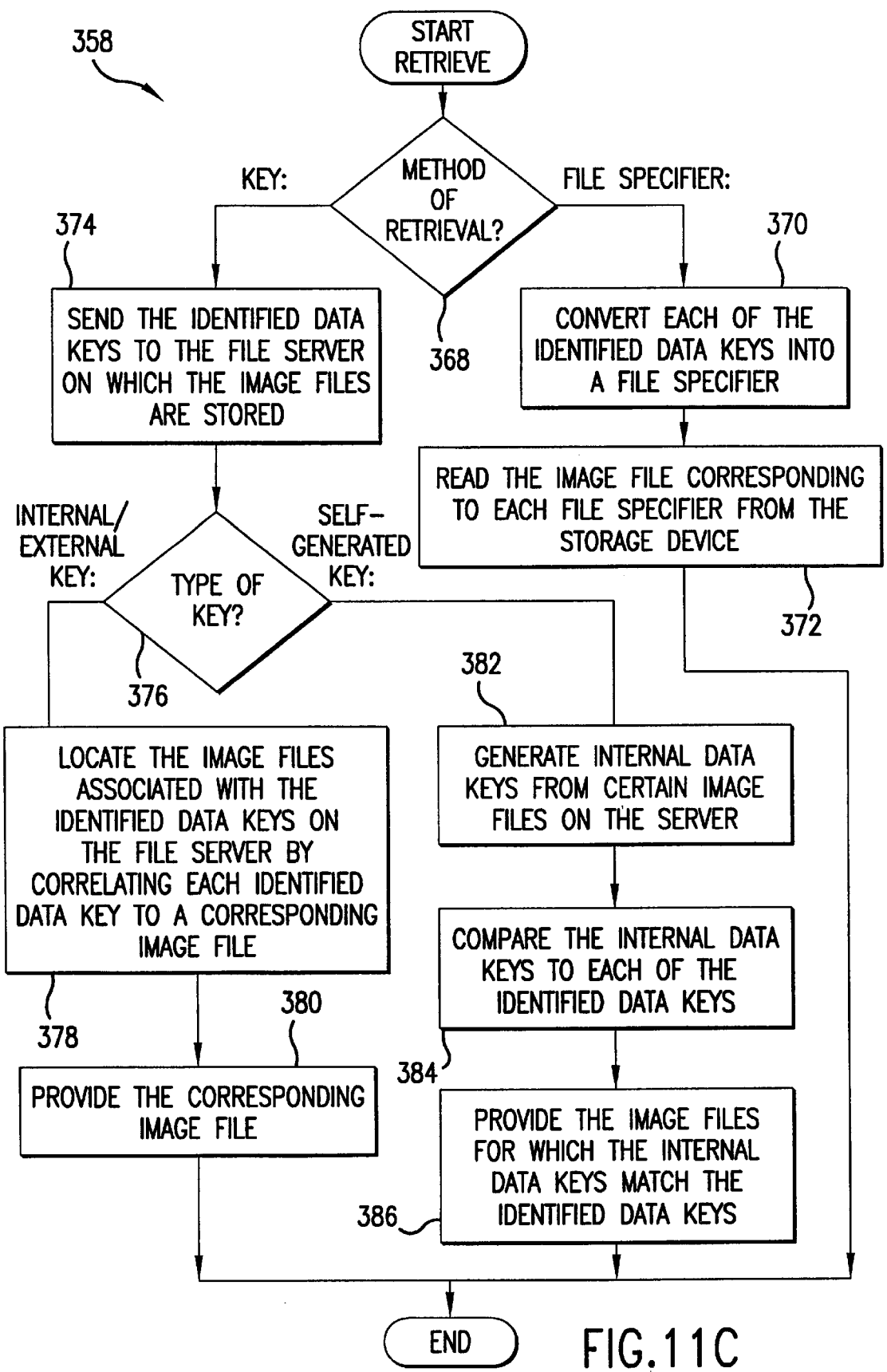

Yet another embodiment of the present invention, as best understood with reference to FIGS. 11A through 11C, is a method 350 for retrieving selected image files from a storage device. The method begins at 352 by the user marking at least one of the image selection areas 54 on the proof sheet 22. The effect of this user marking is to indicate at least one image file to be retrieved, and, in the preferred embodiment, to indicate what operation is to be performed on the image file after retrieval, such as printing the image file on the printer 14' so as to create a photographic print. At 354, the marked proof sheet 22 is optically scanned by the scanner 46 in order to determine the identity marker or markers 60', and the image selection areas 54 that were marked. At 356, the data key representations within the identity marker or markers 60' and associated with the marked image selection areas are identified and converted into the corresponding data keys 128. At 358, the image files corresponding to the marked image selection areas 54 are retrieved from the storage device using the converted data keys 128. At 360, the operations specified in the marked image selection areas 54 are performed on the corresponding ones of the retrieved image files, after which the method concludes.

Considering now in further detail, with particular reference to FIG. 11B, the identifying and converting 356, at 362 the data key representations corresponding to the marked image selection areas 54 are located within the identity marker 60'. The location is preferably done by position, according to the predetermined format of the identity marker 60'. Accordingly, the position of a data key representation within the identity marker 60' correlates it to an associated one of the image selection areas 54 on the proof sheet 22, and further correlates it with one of the thumbnail images 52 which are preferably located adjacent the corresponding one of the image selection areas 54. At 364, the printed patterns of the data key representations for the selected image files are read. At 366, the printed patterns are converted into the corresponding data keys 128, and the identifying and converting 356 concludes.

Considering now in further detail, with particular reference to FIG. 11C, the retrieving 358 the image files from the mass storage device, at 368 the method of retrieval is determined. If the method of image file retrieval is by conversion of the data key 128 into the file specifier for the desired file ("File Specifier" branch of 368), then at 370 each of the identified data keys 128 are converted into file specifiers, and at 372 the image files corresponding to each of the file specifiers are retrieved from the storage device and the retrieving 358 concludes.

If the method of image file retrieval is by comparison with the data key 128 for the desired file ("Key" branch of 368), then at 374 the identified data keys 128 for the desired image files are sent to the file server 230 on which the image files are stored. Typically the user account information is also sent to the server 230 in order to gain access to the user's portion of the file system. At 376, the type of data key 128 is determined. If, as part of the storage process, the file server 230 either embedded the data keys 128 within the corresponding image files, or stored the data keys 128 in a separate link file containing a table of the associated data key 128 and image file pairs ("Internal/External Key" branch of 376), then at 378 the file server 230 locates the image files associated with the identified data keys 128 by correlating each data key 128 with the corresponding image file. At 380, these corresponding image files are provided to the host computer 200 by the server 230, and the retrieving 358 concludes.

If, as part of the storage process, the file server 230 did not store the data keys ("Self-Generated Key" branch of 376), then at 382 the file server 230 generates internal data keys from certain image files stored on the server. At 384, the file server 230 compares these internal data keys with each of the identified data keys for the image files to be retrieved, which are provided to the server 230 by the host computer 200. At 386, the file server 230 provides to the host computer 200 those image files for which the internal data keys generated by the file server 230 match the identified data keys provided to the file server 230 by the host computer 200. Then, the retrieving 358 concludes.

Considering now another aspect of the proof sheets 22, as described heretofore the proof sheets 22 generated by a storage operation 250, or photocopies thereof, are intended to be retained in the proof sheet archive for a future time at which a retrieval operation 350 is desired by the user. If one or more proof sheets 22 are discarded, damaged, or destroyed, the host computer 200 can be used to obtain the image files from the storage device and download them to the printer 14', in an analogous manner to how the printer 14' obtains the image files from the digital camera 12 or the memory card 16 prior to storage. Once the image files are downloaded to the printer 14', a new proof sheet or sheets 22 for those images can be printed and stored in the proof sheet archive 126 for future use.

From the foregoing it will be appreciated that the system and method for enabling a user to store and retrieve digital image files provided by the present invention represent a significant advance in the art. Although several specific embodiments of the invention have been described and illustrated, the invention is not limited to the specific methods, forms, or arrangements of parts so described and illustrated. In particular, while the present invention has been described with reference to storing and retrieving digital images, it can also be used to store other types of information and data which may be desirable to store and retrieve through use of a combination order and proof sheet 22. Therefore, the invention is limited only by the claims.

What is claimed is:

1. A method for storing a plurality of image files onto a storage device, comprising:

forming at least one identity marker collectively indicative of the plurality of image files wherein the forming at least one identity marker includes forming a plurality of data keys, each data key indicative of one of the image files; and printing a proof sheet having a plurality of image representations, each image representation identifying a corresponding one of the plurality of image files, at least one user designation area associated with the plurality of image representations and markable by a user for selecting certain ones of the plurality of image files for storage, the at least one identity marker, and a plurality of data key representations in the at least one identity marker, each data key representation indicative of one of the data keys.

2. The method of claim 1, further comprising:

marking the at least one user designation area to form a marked proof sheet specifying the individual ones of the image files to be stored;

scanning the marked proof sheet to detect markings; and storing the individual ones of the image files corresponding to the markings onto the storage device.

3. The method of claim 2, further comprising:

acquiring the image files from an image source device; and copying the proof sheet before the marking so as to make an copy for use in retrieving the stored image files at a future time.

4. The method of claim 2, wherein the storing further comprises storing the image files on a storage device/medium selected from the group consisting of a hard disk, a CD-ROM, a CD-Rewriteable disk, and a file server.

5. The method of claim 2, further comprising:

storing the data keys onto the storage device.

6. The method of claim 5, further comprising:

associating each of the stored data keys with the corresponding one of the stored image files on the storage device.

7. The method of claim 5, wherein the storing the image files further includes:

embedding each individual one of the data keys into the corresponding ones of the image files.

8. The method of claim 5, wherein the storing the data keys further includes:

storing each individual one of the data keys separately from the corresponding ones of the image files.

9. The method of claim 5, wherein the printing a proof sheet further comprises:

forming the plurality of data key representations by converting each data key to one of the plurality of data key representations.

10. The method of claim 9, wherein the printing a proof sheet further comprises:

printing identification information sufficient to identify the printing apparatus in the at least one identity marker.

11. The method of claim 2, wherein the storing image files further includes storing each of the image files at a specific location on the storage device indicated by a corresponding one of a group of file specifiers, further comprising:

constructing each file specifier from the data key for each of the corresponding image files.

12. The method of claim 1, wherein the printing a proof sheet includes printing the at least one identity marker as a plurality of alphanumeric characters.

13. The method of claim 1, wherein the forming a plurality of data keys further includes:

processing each of the image files so as to calculate the corresponding one of the data keys.

14. The method of claim 13, wherein the processing further includes:

performing a cyclic redundancy check on the contents of each individual one of the image files to form the corresponding one of the data keys.

15. The method of claim 13, wherein the proof sheet is printed by a printing apparatus, and wherein the forming a plurality of data keys further includes:

incorporating identification information into each one of the data keys sufficient to identify the printing apparatus.

16. The method of claim 15, wherein the incorporating identification information includes incorporating into each one of the data keys information indicative of at least one of the group consisting of a manufacturer of the printing apparatus, a model of the printing apparatus, a serial number of the printing apparatus, a user account associated with the printing apparatus, and an index number maintained by the printing apparatus.

17. The method of claim 15, wherein the incorporating identification information includes incorporating into the at least one identity marker information indicative of at least one of the group consisting of a manufacturer of the printing apparatus, a model of the printing apparatus, a serial number of the printing apparatus, a user account associated with the printing apparatus, and an index number maintained by the printing apparatus.

18. A method for storing a plurality of image files onto a storage device, comprising:

forming at least one identity marker collectively indicative of the plurality of image files; and printing a proof sheet having a plurality of image representations, each image representation identifying a corresponding one of the plurality of image files, at least one user designation area associated with the plurality of image representations and markable by a user for selecting certain ones of the plurality of image files for storage, and the at least one identity marker as a non-alphanumeric pattern.

19. The method of claim 18, wherein the printing the at least one identity marker as a non-numeric pattern includes printing a binary pattern comprising a plurality of marked regions selected from the group consisting of printed bit markers representing a first binary state and unprinted bit markers representing a second binary state.

20. A method for storing a plurality of image files onto a storage device, comprising:

forming at least one identity marker collectively indicative of the plurality of image files; and printing a proof sheet having a plurality of image representations, each image representation identifying a corresponding one of the plurality of image files, and at least one user designation area associated with the plurality of image representations and markable by a user for selecting certain ones of the plurality of image files for storage, wherein the printing at least one user designation area includes printing a plurality of image selection areas, each image selection area associated with a corresponding one of the image representations and markable for including the corresponding one of the image files in a selected subset of the image files, and printing a storage selection area markable for specifying a storage operation selected from the group consisting of storing all of the image files, storing the selected subset of the image files, and storing none of the image files, and the at least one identity marker.

21. A method for retrieving image files from a storage device, comprising:

providing a preprinted proof sheet having a plurality of image selection areas each associated with a corresponding one of a plurality of image files and a corresponding one of a plurality of predetermined data key representations;

marking on the proof sheet at least one of the image selection areas corresponding to at least one of the image files to be retrieved;

scanning the marked proof sheet to determine marked image selection areas;

identifying the predetermined data key representations associated with the marked image selection areas and converting the data key representations into the corresponding data keys; and using the identified data keys, retrieving from the storage device the image files associated with the marked image selection areas.

22. The method of claim 21, wherein each of the predetermined data key representations includes a printed pattern indicative of a data key, wherein the identifying and converting further includes:

locating the associated data key representations on the marked proof sheet;

reading the printed patterns of the associated data key representations; and converting the printed patterns into associated data keys.

23. The method of claim 21, wherein the retrieving includes:

converting each of the identified data keys into a file specifier; and reading from the storage device the image file corresponding to each file specifier.

24. The method of claim 21, wherein the retrieving includes:

sending the identified data keys to a file server; and on the file server, locating the image files associated with the identified data keys.

25. The method of claim 24, wherein the locating further includes:

correlating each of the identified data keys to a corresponding file specifier; and providing the image file corresponding to each file specifier.

26. The method of claim 24, wherein the locating further includes:

for certain ones of the image files on the server, generating internal data keys from the image file content;

comparing the internal data keys to each of the identified data keys; and providing the image files for which the internal data keys match individual ones of the identified data keys.

27. The method of claim 21, wherein the marking at least one of the image selection areas includes specifying an operation to be performed on the corresponding one of the image files, further comprising:

performing the specified operation on the corresponding one of the image files after retrieval.

28. The method of claim 27, wherein the performing the specified operation includes printing the corresponding one of the image files.

* * * * *

UNITED STATES PATENT AND TRADEMARK OFFICE
CERTIFICATE OF CORRECTION

PATENT NO. : 6,535,298 B2
DATED : March 18, 2003
INVENTOR(S) : Kirt A. Winter et al.

It is certified that error appears in the above-identified patent and that said Letters Patent is hereby corrected as shown below:

Column 2,
Line 31, after "system" insert -- . --

Column 3,
Line 48, delete "performing an" and insert therefor -- perform a --

Column 8,
Line 5, after "thereof" insert -- . --

Column 11,
Line 27, after "the" insert -- storage subsystem --
Line 38, after "the" insert -- data keys 128 --

Column 18,
Line 7, delete "claim 5" and insert therefor -- claim 1 --

Signed and Sealed this

Twelfth Day of April, 2005

JON W. DUDAS
*Director of the United States Patent and Trademark Office*